US012793365B2

(12) United States Patent
Chen et al.

(10) Patent No.: US 12,793,365 B2
(45) Date of Patent: Nov. 10, 2026

(54) DATA PROCESSING METHOD AND APPARATUS IN VIRTUAL SCENE, DEVICE, STORAGE MEDIUM, AND PROGRAM PRODUCT

(71) Applicant: Tencent Technology (Shenzhen) Company Limited, Shenzhen (CN)

(72) Inventors: Xiaofeng Chen, Shenzhen (CN); Yuanyuan Pei, Shenzhen (CN); Yun Ai, Shenzhen (CN); Xingqi Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 56 days.

(21) Appl. No.: 18/761,142

(22) Filed: Jul. 1, 2024

(65) Prior Publication Data

US 2024/0355082 A1 Oct. 24, 2024

Related U.S. Application Data

(63) Continuation of application No. PCT/CN2023/097393, filed on May 31, 2023.

(30) Foreign Application Priority Data

Aug. 12, 2022 (CN) ........................ 202210966075.X

(51) Int. Cl.
*G06T 19/20* (2011.01)
*G06T 7/70* (2017.01)

(52) U.S. Cl.
CPC ................ *G06T 19/20* (2013.01); *G06T 7/70* (2017.01); *G06T 2219/2016* (2013.01)

(58) Field of Classification Search
None
See application file for complete search history.

(56) References Cited

U.S. PATENT DOCUMENTS

2009/0295715 A1* 12/2009 Seo ..................... G06F 3/04886 345/156
2013/0335405 A1 12/2013 Scavezze et al.
(Continued)

FOREIGN PATENT DOCUMENTS

CN 112107858 A 12/2020
CN 112598785 A 4/2021
(Continued)

OTHER PUBLICATIONS

Wikihow, "How to Change Your Profile Picture on Facebook", 2021, URL: https://web.archive.org/web/20210417154840/https://www.wikihow.com/Change-Your-Profile-Picture-on-Facebook (Year: 2021).*

(Continued)

*Primary Examiner* — David H Chu
(74) *Attorney, Agent, or Firm* — Morgan, Lewis & Bockius LLP

(57) ABSTRACT

This application provides a method for processing data in a virtual scene performed by an electronic device. The method includes: receiving an instruction for editing a three-dimensional model of a virtual object controlled by a target user in the virtual scene; in response to the instruction, displaying an editing interface configured for editing the three-dimensional model of the virtual object, the three-dimensional model comprising a character model having an appearance of the virtual object and at least one information component carrying object information of the virtual object; and constructing a target three-dimensional model of the virtual
(Continued)

object on the editing interface in accordance with subsequent instruction from the target user.

20 Claims, 18 Drawing Sheets

(56) References Cited

U.S. PATENT DOCUMENTS

| | | | | |
|---|---|---|---|---|
| 2019/0339847 | A1* | 11/2019 | Scapel | G06T 13/80 |
| 2020/0358726 | A1* | 11/2020 | Dryer | G06F 3/0481 |
| 2021/0349612 | A1* | 11/2021 | Triverio | G06T 19/20 |
| 2021/0409535 | A1* | 12/2021 | Mourkogiannis | G06T 13/40 |
| 2023/0281940 | A1* | 9/2023 | Shen | G06V 20/20 345/419 |
| 2024/0104859 | A1* | 3/2024 | Chand | G06T 19/20 |

FOREIGN PATENT DOCUMENTS

| | | | |
|---|---|---|---|
| CN | 114092675 | A | 2/2022 |
| CN | 114130017 | A | 3/2022 |
| CN | 114797108 | A | 7/2022 |
| JP | 2001334071 | A | 12/2001 |
| JP | 2003076456 | A | 3/2003 |
| JP | 2016067900 | A | 5/2016 |
| JP | 2017146818 | A | 8/2017 |
| JP | 2020005238 | A | 1/2020 |
| JP | 2020009220 | A | 1/2020 |
| JP | 2022089736 | A | 6/2022 |
| WO | WO 2020110270 | A1 | 6/2020 |

OTHER PUBLICATIONS

Tencent Technology, WO+IPRP, PCT/CN2023/097393, Sep. 7, 2023, 7 pgs.

Tencent Technology, Japanese Office Action, JP Patent Application No. 2024-532935, Apr. 4, 2025, 10 pgs.

Tencent Technology, ISR, PCT/CN2023/097393, Sep. 7, 2023, 3 pgs.

Blue-Reflection.com, “Blue Reflection: Second Light Update” Nov. 2021, Retrieved from the Internet: https://blue-reflection.com/secondlight/US/updates.html.

Gamespot.com, “Dota 2 20th November Patch - Content Analysis”, Nov. 2014, Retrieved from the Internet: https://www.gamespot.com/articles/dota-2-20th-november-patch-content-analysis/1100-6438533/.

* cited by examiner

DATA PROCESSING METHOD AND APPARATUS IN VIRTUAL SCENE, DEVICE, STORAGE MEDIUM, AND PROGRAM PRODUCT

CROSS-REFERENCE TO RELATED APPLICATIONS

This application is a continuation application of PCT Patent Application No. PCT/CN2023/097393, entitled "DATA PROCESSING METHOD AND APPARATUS IN VIRTUAL SCENE, DEVICE, STORAGE MEDIUM, AND PROGRAM PRODUCT" filed on May 31, 2023, which claims priority to Chinese National Intellectual Property Administration No. 202210966075.X, entitled "DATA PROCESSING METHOD AND APPARATUS IN VIRTUAL SCENE, DEVICE, STORAGE MEDIUM, AND PROGRAM PRODUCT" filed on Aug. 12, 2022, both of which are incorporated herein by reference in their entirety.

FIELD OF THE TECHNOLOGY

This application relates to the field of internet technologies, and in particular, to a data processing method and apparatus in a virtual scene, an electronic device, a computer-readable storage medium, and a computer program product.

BACKGROUND OF THE DISCLOSURE

In a related shooting game, to consider both computing performance of an electronic device and a presentation effect in a game scene, a three-dimensional model globally presented to a player is generally preset according to particular rules. A presented three-dimensional model and content of an information card are determined based on data when the player enter the game. Flexibility of an editing operation for the three-dimensional model is poor, and utilization of display resources and processing resources of the device is low. Because interaction information for the player in the game is presented mostly through a static text, a sense of fragmentation between the interaction information and a character model corresponding to the player is strong, so that an entire presentation effect is poor.

SUMMARY

The embodiments of this application provide a data processing method and apparatus in a virtual scene, an electronic device, a computer-readable storage medium, and a computer program product. Flexibility of an editing operation, can further ensure integrity of a three-dimensional model during presentation can be improved, and a presentation effect of the three-dimensional model can be improved.

An embodiment of this application provides a method for processing data in a virtual scene, the method including:

receiving an instruction for editing a three-dimensional model of a virtual object controlled by a target user in the virtual scene;

in response to the instruction, displaying an editing interface configured for editing the three-dimensional model of the virtual object, the three-dimensional model comprising a character model having an appearance of the virtual object and at least one information component carrying object information of the virtual object; and constructing a target three-dimensional model of the virtual object on the editing interface in accordance with subsequent instruction from the target user.

An embodiment of this application provides an electronic device, including:

a memory, configured to store executable instructions; and a processor, configured to, when executing the executable instructions stored in the memory, implement a method for processing data in a virtual scene provided in the embodiments of this application.

An embodiment of this application provides a non-transitory computer-readable storage medium, having computer-executable instructions stored therein. When the computer-executable instructions are executed by a processor of an electronic device, the electronic device is caused to perform the method for processing data in a virtual scene provided in the embodiments of this application.

The embodiments of this application include the following beneficial effects.

By applying the embodiments of this application, an editing interface is presented based on a received editing instruction for a three-dimensional model, and editing operations on a character model, a border model, and an information component for the three-dimensional model are completed based on the editing interface, to obtain a target three-dimensional model of a virtual object. Therefore, a hardware processing resource of an electronic device can be fully utilized, on-demand editing for the three-dimensional model is implemented, and flexibility of an editing operation for the three-dimensional model is improved. The target three-dimensional model is presented at a presentation position of the three-dimensional model in a virtual scene, so that an edited three-dimensional model is presented. An appearance of the character model of the three-dimensional model is consistent with an appearance of the virtual object, and the three-dimensional model carries the border model of the character model, so that at least one information component is configured on the border model, and the information component carries object information of the virtual object. Therefore, display resources of the electronic device are fully utilized, and a presentation effect of the three-dimensional model is improved.

DESCRIPTION OF EMBODIMENTS

Figure 1:
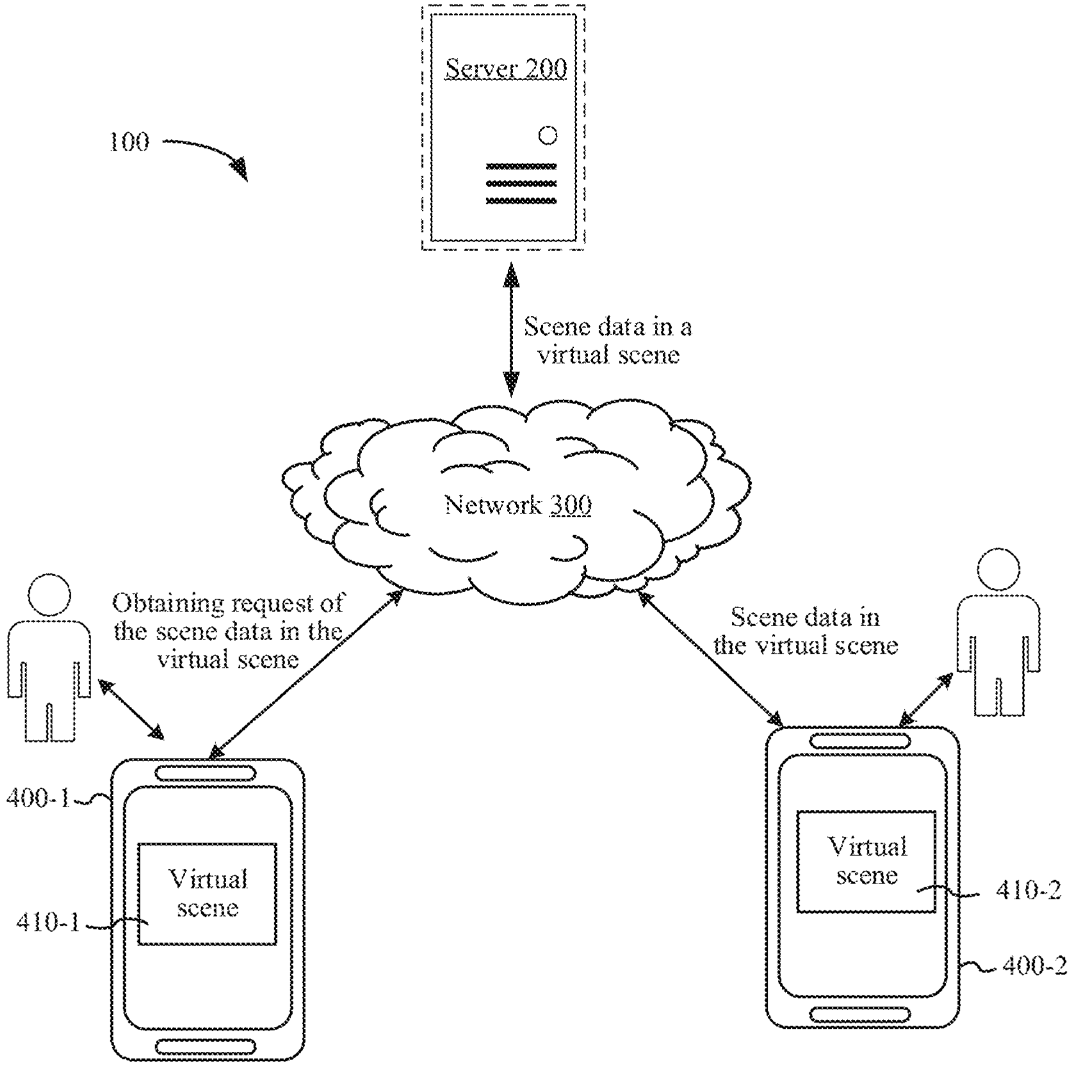
FIG. 1 is a schematic diagram of an architecture of a data processing system 100 in a virtual scene according to an embodiment of this application.

To make objectives, technical solutions, and advantages of this application clearer, the following describes this application in detail with reference to the accompanying drawings. The described embodiments are not to be construed as limitation on this application. All other embodiments obtained by a person of ordinary skill in the art based on the embodiments of this application without creative efforts shall fall within the protection scope of this application.

"Some embodiments" involved in the following description describes a subset of all possible embodiments. However, "some embodiments" may be same or different subsets of all the possible embodiments, and may be combined with each other when there is no conflict.

In the following description, the terms "first", "second", and "third" are merely intended to distinguish between similar objects and do not indicate a specific sequence of the objects. A specific order or sequence of the "first", "second", and "third" may be interchanged if permitted, so that the embodiments of this application described herein may be implemented in a sequence other than the sequence illustrated or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are described in detail, terms involved in the embodiments of this application are described, and the nouns and the terms involved in the embodiments of this application are applicable to the following explanations.

(1) A client is an application that runs in a terminal and that is configured to provide various services, such as an instant communication client and a video playing client.

(2) "In response to" is configured for representing a condition or a status on which an executed operation depends, and when a dependent condition or status is met, one or more executed operations may be in real time or may have a set delay. There is no limitation on a sequence in which operations are performed without particular description.

(3) The virtual scene is a virtual scene displayed when the application runs on the terminal. The virtual scene may be a simulated environment of the real world, a semi-simulated and semi-fictional virtual environment, or a purely fictional virtual environment. The virtual scene may be any one of a two-dimensional virtual scene, a 2.5-dimensional virtual scene, or a three-dimensional virtual scene. Dimensions of the virtual scene are not limited in the embodiments of this application. For example, the virtual scene may include the sky, the land, and the ocean. The land may include environmental elements such as deserts and cities. A user may control a virtual object to perform an action in the virtual scene, and the action includes but is not limited to: any one of adjusting a body posture, crawling, walking, running, riding, jumping, driving, picking up, shooting, attacking, or throwing. The virtual scene may be a virtual scene displayed from a first-person perspective (for example, a virtual object in a game is played in a perspective of a player), may be a virtual scene displayed from a third-person perspective (for example, the game is played in a perspective of the player chasing the virtual object in the game), or may be a virtual scene displayed from an aerial view. The perspectives may be switched in any manner.

That the virtual scene is displayed from the first-person perspective is used as an example. A virtual scene displayed in a human-machine interaction interface may include: based on a viewing position and a field of view angle of the virtual object in a full virtual scene, determining a field of view of the virtual object, and displaying a part of the virtual scene located in the field of view in the full virtual scene, that is, the displayed virtual scene may be the part of the virtual scene relative to a panoramic virtual scene. Because the first-person perspective is the most impactful viewing perspective for the user, in this case, immersive perception for the user during operation can be implemented. That the virtual scene is displayed from the aerial view is used as an example. A virtual scene displayed in a human-computer interaction interface may include: in response to a zooming operation for the panoramic virtual scene, displaying a part of the virtual scene corresponding to the zooming operation in the human-computer interaction interface, that is, the displayed virtual scene may be the part of the virtual scene relative to a panoramic virtual scene. This can improve operability of the user during the operation, and can improve human-computer interaction efficiency.

(4) Virtual objects are images of various people and objects that may be interacted with in the virtual scene, or movable objects in the virtual scene. The movable object may be a virtual character, a virtual animal, an animation character, or the like, for example, a person, an animal, a plant, an oil drum, a wall, or a stone displayed in the virtual scene. The virtual object may be a virtual avatar representing the user in the virtual scene. The virtual scene may include a plurality of virtual objects. Each virtual object has a shape and a volume of the virtual object in the virtual scene, and occupies a part of space in the virtual scene.

During actual application, the virtual object may be a user role controlled through operations on the client, may be artificial intelligence (AI) set in a fight in the virtual scene through training, or may be a non-player character (NPC) set in interaction in the virtual scene. For example, the virtual object may be a virtual character that interacts adversarially in the virtual scene. For example, a quantity of virtual objects participating in the interaction in the virtual scene may be preset, or may be dynamically determined based on a quantity of clients participating in the interaction.

A shooting game is used as an example. The user may control the virtual object to fall freely, glide, open a parachute to fall, or the like in the sky of the virtual scene; to run, jump, crawl, bend and move forward, or the like in the land; and may also control the virtual object to swim, float, dive, or the like in the ocean. It is clear that, the user may also control the virtual object to ride a vehicle-type virtual item to move in the virtual scene, for example, the vehicle-type virtual item may be a virtual car, a virtual aircraft, or a virtual yacht. The user may also control the virtual object to interact adversarially with another virtual object by using an attack-type virtual item, for example, the virtual item may be a virtual mecha, a virtual tank, or a virtual fighter. The foregoing scene is used as an example for description, and this is not limited in the embodiments of this application.

(5) Scene data represents various features displayed by objects in the virtual scene during interaction, for example, may include a position of the object in the virtual scene. It is clear that, different types of features may be included based on a type of virtual scene. For example, in the virtual scene of the game, the scene data may include waiting time of various functions configured in the virtual scene (depending on a quantity of times of a same function that may be used in a specific time), and may also represent attribute points of various status of game characters, including, for example, a health point (also referred to as a "red point"), a magic point (also referred to as a "blue point"), and a status point.

(6) A three-dimensional model, also referred to as a 3D model, is a 3D virtual character model displayed to the player in the game that is fully consistent with a character appearance of the player character. The model is not only stationary, but may perform various actions based on settings of the player.

(7) A three-dimensional user interface (3D UI) means that content (including but not limited to content of a text, a number, an image, and the like) originally displayed on a two-dimensional (2D) user interface (UI) is combined in the 3D model for displaying in a technical manner.

Based on explanations of the terms involved in the embodiments of this application, the following describes a data processing system in a virtual scene provided in the embodiments of this application. Referring to FIG. 1, FIG. 1 is a schematic diagram of an architecture of a data processing system 100 in a virtual scene according to an embodiment of this application. To support an exemplary application, a terminal (for example, a terminal 400-1 and a terminal 400-2 are shown) is connected to a server 200 through a network 300. The network 300 may be a wide area network, or a local area network, or a combination of the wide area network and the local area network, and uses a wireless or wired link for data transmission.

The terminal (for example, the terminal 400-1 or the terminal 400-2) is configured to: receive, based on a view interface, a triggering operation of entering the virtual scene, and send an obtaining request of scene data of the virtual scene to the server 200.

The server 200 is configured to: receive the obtaining request of the scene data, and return the scene data of the virtual scene to the terminal in response to the obtaining request.

The terminal (for example, the terminal 400-1 or the terminal 400-2) is configured to: receive the scene data of the virtual scene, render an image of the virtual scene based on the obtained scene data, and display the image of the virtual scene of a target (virtual) object on a graphical interface (for example, a graphical interface 410-1 and a graphical interface 410-2 are shown); in the virtual scene, the terminal receives an editing instruction triggered by a target object (namely, a target user) for a three-dimensional model (of the target object); displays an editing interface configured for editing the three-dimensional model of the virtual object, the virtual object corresponding to the target object, the three-dimensional model including a character model consistent with an appearance of the virtual object and a border model surrounding the character model, at least one information component being configured on the border model, and the information component carrying object information of the virtual object; determines an edited target three-dimensional model of the virtual object based on the editing interface; and presents the target three-dimensional model of the virtual object at a presentation position of the three-dimensional model in the virtual scene. All content displayed on the image of the virtual scene is obtained by rendering the returned scene data of the virtual scene.

During actual application, the server 200 may be an independent physical server, or a server cluster or a distributed system composed of a plurality of physical servers, or may alternatively be a cloud server that provides a cloud service, a cloud database, cloud computing, a cloud function, cloud storage, a network service, cloud communication, a middleware service, a domain name service, a security service, a content delivery network (CDN), and a basic cloud computing service such as big data or an artificial intelligence platform. The terminal (for example, the terminal 400-1 or the terminal 400-2) may be a smartphone, a tablet computer, a laptop computer, a desktop computer, a smart speaker, a smart television, and a smart watch, but this is not limited thereto. The terminal (for example, the terminal 400-1 or the terminal 400-2) and the server 200 may be connected directly or indirectly in a wired or wireless communication protocol. This is not limited in this application.

In an actual implementation, the terminal (including the terminal 400-1 and the terminal 400-2) installs and runs an application supporting the virtual scene. The application may be any one of a first-person shooting game (FPS), a third-person shooting game, a driving game having a steering operation as a main action, a multiplayer online battle arena game (MOBA), a two-dimensional (2D) game application, a three-dimensional (3D) game application, a virtual reality application, a three-dimensional map program, a simulation program, or a multiplayer gunfight survival game. The application may alternatively be a console application, such as a console 3D game program.

An electronic game scene is used as an example scenario. A user may operate on the terminal in advance, and the terminal may download a game configuration file of an electronic game after detecting the operation of the user. The game configuration file may include an application, interface display data, virtual scene data, or the like of the electronic game, so that the user can invoke the game configuration file when logging in to the electronic game on the terminal, to render and display an interface of the electronic game. The user may perform a touch operation on the terminal. After detecting the touch operation, the terminal may determine game data corresponding to the touch operation, and render and display the game scene. The game data may include the virtual scene data, action data of the virtual object in the virtual scene, and the like.

During actual application, the terminal (including the terminal 400-1 and the terminal 400-2) receives, based on a view interface, a triggering operation of entering the virtual scene, and sends an obtaining request of scene data of the virtual scene to the server 200. The server 200 receives the obtaining request of the scene data, and returns the scene data of the virtual scene to the terminal in response to the obtaining request. The terminal receives the scene data of the virtual scene, renders an image of the virtual scene based on the scene data, to display the virtual object in an interface of the virtual scene, and when a presentation condition of the three-dimensional model of the virtual object is satisfied, presents the target three-dimensional model (the edited three-dimensional model of the virtual object based on the editing interface) of the virtual object at the presentation position in the virtual scene.

The embodiments of this application may alternatively be implemented by using a cloud technology. The cloud technology is a hosting technology that unifies a series of resources such as hardware, software, and a network in a wide area network or a local area network, to implement data computing, storage, processing, and sharing.

A general term for a network technology, an information technology, an integration technology, a management platform technology, and an and power application technology that are applied based on a cloud computing business model. The cloud technology can form resource pools and be used on demand. A cloud computing technology is an important support. A background service of a technical network system needs a large quantity of computing and storage resources.

Figure 2:
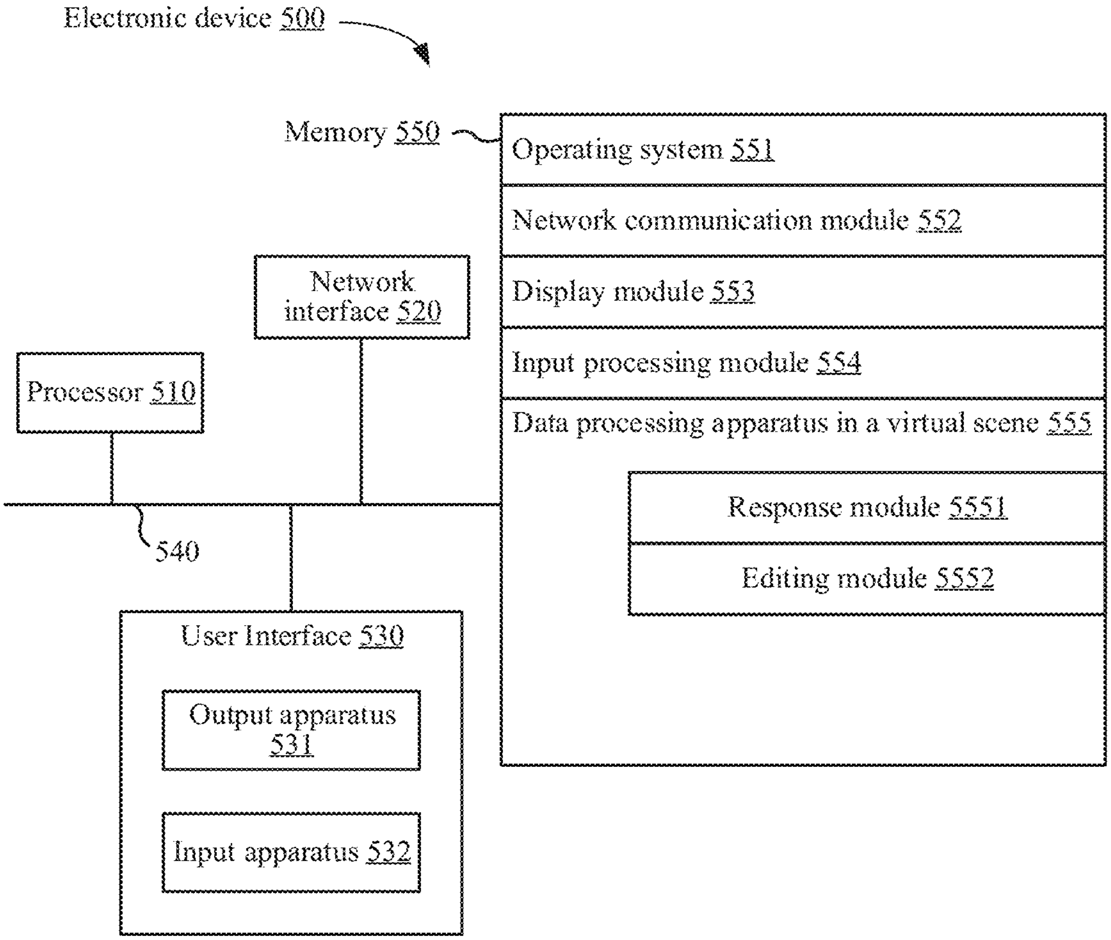
FIG. 2 is a schematic diagram of a structure of an electronic device 500 of a method for processing data in a virtual scene according to an embodiment of this application.

Referring to FIG. 2, FIG. 2 is a schematic diagram of a structure of an electronic device 500 of a method for processing data in a virtual scene according to an embodiment of this application. In an actual implementation, the electronic device 500 may be the server or the terminal shown in FIG. 1. That the electronic device 500 is the terminal shown in FIG. 1 is used as an example to describe the electronic device of the data processing method in the virtual scene provided in the embodiments of this application. The electronic device 500 provided in the embodiments of this application may include at least one processor 510, a memory 550, at least one network interface 520, and a user interface 530. All the components in the electronic device 500 are coupled together by using a bus system 540. The bus system 540 is configured to implement connection and communication between the components. In addition to a data bus, the bus system 540 further includes a power bus, a control bus, and a state signal bus. However, for ease of clear description, all types of buses are marked as the bus system 540 in FIG. 2.

The processor 510 may be an integrated circuit chip having a signal processing ability, for example, a general processor, a digital signal processor (DSP), or another programmable logic device, a discrete gate or a transistor logic device, or a discrete hardware component, where the general processor may be a microprocessor, any conventional processor, or the like.

The user interface 530 includes one or more output apparatuses 531 that can display media content, including a speaker and/or a visual display screen. The user interface 530 also includes one or more input apparatuses 532, including a user interface component that facilitate user input such as a keyboard, a mouse, a microphone, a touch-screen display screen, a camera, another input button, or a control.

The memory 550 may be a removable memory, a non-removable memory, or a combination of a removable memory and a non-removable memory. Exemplary hardware devices include a solid state memory, a hard drive, an optical disk drive, and the like. The memory 550 includes one or more storage devices physically remote from the processor 510.

The memory 550 may be a volatile memory or a non-volatile memory, or may include both a volatile memory and a non-volatile memory. The non-volatile memory may be a read only memory (ROM), or the volatile memory may be a random access memory (RAM). The memory 550 described in the embodiments of this application is intended to include, but is not limited to, memories of any suitable type.

In some embodiments, the memory 550 can store data to support various operations. An example of the data includes a program, a module, a data structure, or a subset or a superset of the data. The following is an example for description.

An operating system 551 includes a system program configured to handle various basic system services and perform a hardware related task, for example, a framework layer, a core library layer, or a driver layer, used for implementing various basic services and processing a task based on hardware.

A network communication module 552 is configured to reach another computing device through one or more (wired or wireless) network interfaces 520. Exemplary network interfaces 520 include Bluetooth, wireless fidelity (Wi-Fi), a universal serial bus (USB), and the like.

A display module 553 is configured to present information (such as a user interface configured for operating a peripheral device and displaying content and information) through one or more output apparatuses 531 (such as a display screen and a speaker) associated with a user interface 530.

An input processing module 554 is configured to: detect input or interaction of the user from one or more input apparatuses 532, and translate the detected input or interaction.

In some embodiments, a data processing apparatus in the virtual scene provided in the embodiments of this application may be implemented by using software. FIG. 2 shows a data processing apparatus 555 in a virtual scene that is stored in the memory 550. The data processing apparatus 555 may be software in a form of a program, a plug-in, or the like, including the following software modules: a response module 5551 and an editing module 5552. These modules are logical and can be combined or split in different manners depending on implemented functions, the function of each module is described as follows.

In some other embodiments, the data processing apparatus in the virtual scene provided in the embodiments of this application may be implemented in a combination of software and hardware. For example, the data processing apparatus in the virtual scene provided in the embodiments of this application may be implemented by using a hardware-coded processor, where the hardware-decoding processor is programed to perform the data processing apparatus in the virtual scene provided in the embodiments of this application. For example, the hardware-decoding processor may use one or more application specific integrated circuits (ASICs), DSPs, programmable logic devices (PLDs), complex programmable logic devices (CPLDs), field-programmable gate arrays (FPGAs), or other electronic elements.

Based on the foregoing explanation of the data processing system and the electronic device in the virtual scene provided in the embodiments of this application, the following describes the data processing method in the virtual scene provided in the embodiments of this application. In some embodiments, the data processing method in the virtual scene provided in the embodiments of this application may be implemented by the server or the terminal separately, or may be implemented by the server and the terminal collaboratively. In some embodiments, the terminal or the server may implement the data processing method in the virtual scene provided in the embodiments of this application by running a computer program. For example, the computer program may be an original program or a software module in the operating system; may be a native application (APP), to be specific, a program that needs to be installed in the operating system to run, such as a client supporting the virtual scene, for example, a game APP; or may be a mini program, to be specific, a program that only needs to be downloaded to a browser environment to run; or may alternatively be a mini program that can be embedded into any APP. In conclusion, the computer program may be any form of application, module, or plug-in.

Figure 3:
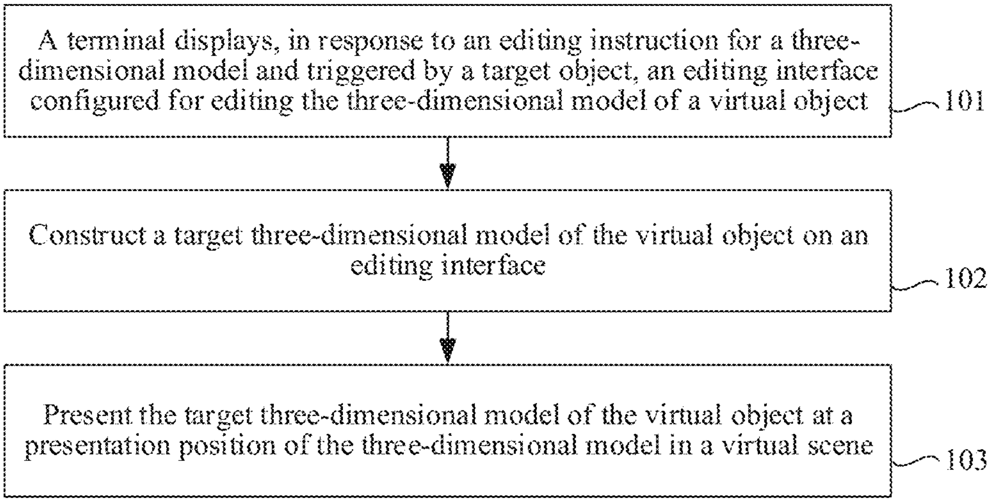
FIG. 3 is a schematic flowchart of a method for processing data in a virtual scene according to an embodiment of this application.

During actual application, the data processing method in the virtual scene provided in the embodiments of this application may be implemented by the server or the terminal separately, or may be implemented by the server and the terminal collaboratively. That the terminal performs implementation separately is used as an example to describe the data processing method in the virtual scene provided in the embodiments of this application. Referring to FIG. 3, FIG. 3 is a schematic flowchart of a method for processing data in a virtual scene according to an embodiment of this application. The data processing method in the virtual scene provided in the embodiments of this application includes the following operations:

Operation 101: A terminal displays, in response to an editing instruction for a three-dimensional model and triggered by a target object, an editing interface configured for editing the three-dimensional model of a virtual object.

The three-dimensional model may be a three-dimensional image model. The three-dimensional model includes at least one of a character model consistent with an appearance of the virtual object and a border model surrounding the character model, in other words, includes the character model consistent with the appearance of the virtual object and/or the border model surrounding the character model. At least one information component is configured on the border model, and the information component carries object information of the virtual object.

The virtual object corresponds to a target object, to be specific, an appearance of the three-dimensional model is consistent with the appearance of the virtual object, in other words, the three-dimensional model has the same appearance as the virtual object. When the virtual scene is a game scene, correspondingly, the virtual object is a game character of a player (user) in the game scene. The player may edit, based on an editing interface, the three-dimensional model having the same appearance as the game character of the player, such as a virtual sculpture or a virtual statue having the same appearance as the game character of the player. The border model may be referred to as a border configured to carry or load an edited three-dimensional model, and may also referred to as a bounding box. The object information is information of the virtual object in the virtual scene, such as a name, a game mastery value, and a game performance value.

During actual implementation, the terminal is deployed with an application client supporting the virtual scene, such as a virtual scene-specific application client or an application server having a function of the virtual scene. When the virtual scene is the game scene, the virtual scene-specific application client is a game client, and the application server having the function of the virtual scene may be an instant communication client, an education client, a video playing client, or the like. The terminal runs the application client based on an activation operation for the application client, displays an activation interface ("start game") of the virtual scene (such as a shooting game scene), and presents the three-dimensional model corresponding to the virtual object controlled by the player on the activation interface. Alternatively, in an interface of the virtual scene (that is, during game playing), the terminal may also present the three-dimensional model of the virtual object at a preset presentation position in the virtual scene based on actual demand.

During actual application, the virtual object may be a virtual image in the virtual scene corresponding to a user account currently logged in to in the application client. For example, the virtual object may be the virtual object controlled by the user when entering the shooting game. It is clear that, other virtual objects or interaction objects may also be included in the virtual scene, and may be controlled by other users or robot programs. The player is represented by the virtual object in the virtual scene. In addition, when a presentation condition for the three-dimensional model is satisfied, the three-dimensional model corresponding to the player may also be presented. The three-dimensional model may be the virtual sculpture or the virtual statue (to be specific, a three-dimensional image model in the virtual scene, not a two-dimensional image presented in the interface of the virtual scene) of the player in the virtual scene. An appearance of the character model in the virtual sculpture (statue) is consistent with an appearance of the virtual object controlled by the player in the virtual scene. The virtual sculpture (statue) may also include the border model, to be specific, a border configured to carry the virtual sculpture (statue). The border model also carries the information component configured to display the object information of the virtual object. The information component may be configured to present object information of a target form of the virtual object. The target form may include at least one of a three-dimensional text form or a three-dimensional image form. Both the border model and the information component are models having three-dimensional structures in the virtual scene, not two-dimensional images.

Figure 4:
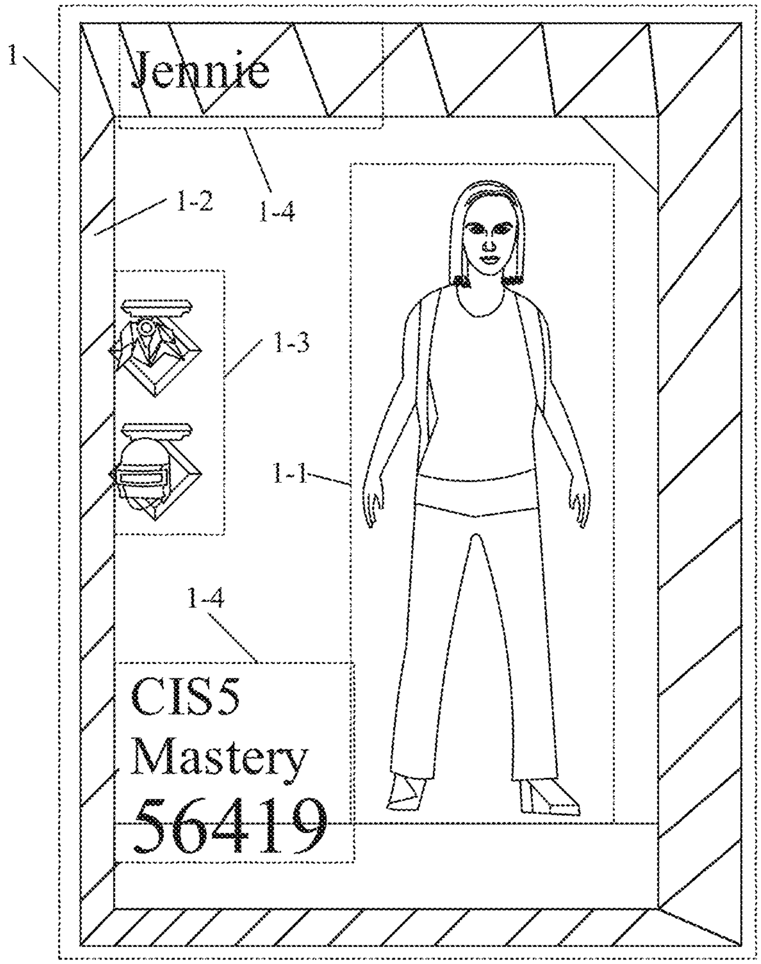
FIG. 4 is a schematic diagram of a three-dimensional model of a virtual object according to an embodiment of this application.

For example, referring to FIG. 4, FIG. 4 is a schematic diagram of a three-dimensional model of a virtual object according to an embodiment of this application. In the figure, reference numeral 1 shows an entire three-dimensional model corresponding to a virtual object A. Reference numeral 1-1 shows a character model in the three-dimensional model, an appearance of the character model being consistent with an appearance of the virtual object A. Reference numeral 1-2 shows a border model in the three-dimensional model, the border model being three-dimensional, and a border shape of the border model may be set based on an actual situation, such as a square, a rectangle, or a hexagon. Reference numeral 1-3 shows an information component (such as a virtual medal of the virtual object A) in a three-dimensional image form carried (mounted) on the border model. Reference numeral 1-4 shows an information component in a three-dimensional text form carried (mounted) on the border model, and the information component may be configured to display an object name, a game mastery value, a game performance value, and the like of the virtual object A.

A triggering manner of an editing instruction for the three-dimensional model is described. In some embodiments, a terminal may receive the editing instruction for the three-dimensional model in the following manner: The terminal displays an editing control for the three-dimensional model in an interface of the virtual object in a virtual scene. The terminal receives the editing instruction in response to a triggering operation for the editing control, and displays an editing interface configured for editing the three-dimensional model in the interface of the virtual scene.

During actual implementation, an application client of the virtual scene may also provide a function for editing the three-dimensional model to a player. When receiving the editing instruction of the player for the three-dimensional model corresponding to the player, the terminal displays, in response to a current editing instruction, the editing interface configured for editing the three-dimensional model. In the editing interface, the three-dimensional model may be set customarily.

In some embodiments, the terminal may receive the editing instruction for the three-dimensional model in the following manner: The terminal displays the interface of the virtual scene; when the editing condition of the three-dimensional model is satisfied, displays editing prompt information in the interface of the virtual scene, the editing prompt information being configured to prompt that a target object has a permission to edit the three-dimensional model; and receives the editing instruction triggered by the three-dimensional model based on the editing prompt information. In other words, there is an editing condition corresponding to editing of the three-dimensional model, and not all objects can perform the editing of the three-dimensional model. The editing condition is set to improve enthusiasm of a player object, enhance human-computer interaction, and improve utilization of hardware resources of an electronic device. The target object is prompted to enable the target object to timely learn that the target object has the permission to edit the three-dimensional model. Therefore, the three-dimensional model is edited, and utilization of display resources of the electronic device is improved.

During actual implementation, the terminal displays the interface (for example, in a shooting game, displays the interface of the virtual scene during a game) of the virtual scene. The virtual object performs an interaction operation with another object in the virtual scene, and has corresponding interaction information. A shooting game including a first half and a second half is used as an example. During the game, the interaction information (such as a health point, a magic point, a status point, or a kill count) of the virtual object changes constantly. The editing condition for a three-dimensional image may be set based on the interaction information of the virtual object. When the editing condition is satisfied, the editing prompt information configured to prompt that the target object has the permission to edit the three-dimensional model is directly displayed in the interface of the virtual scene. The editing prompt information may be displayed in a form of a floating layer (pop-up window), to be specific, when the editing condition is satisfied, in the interface of the virtual scene, the floating layer including the editing prompt information is displayed, and the floating layer may also include a confirm function option and a cancel function option. The terminal receives the editing instruction for the three-dimensional model in response to a triggering operation for the confirm function option.

Figure 5:
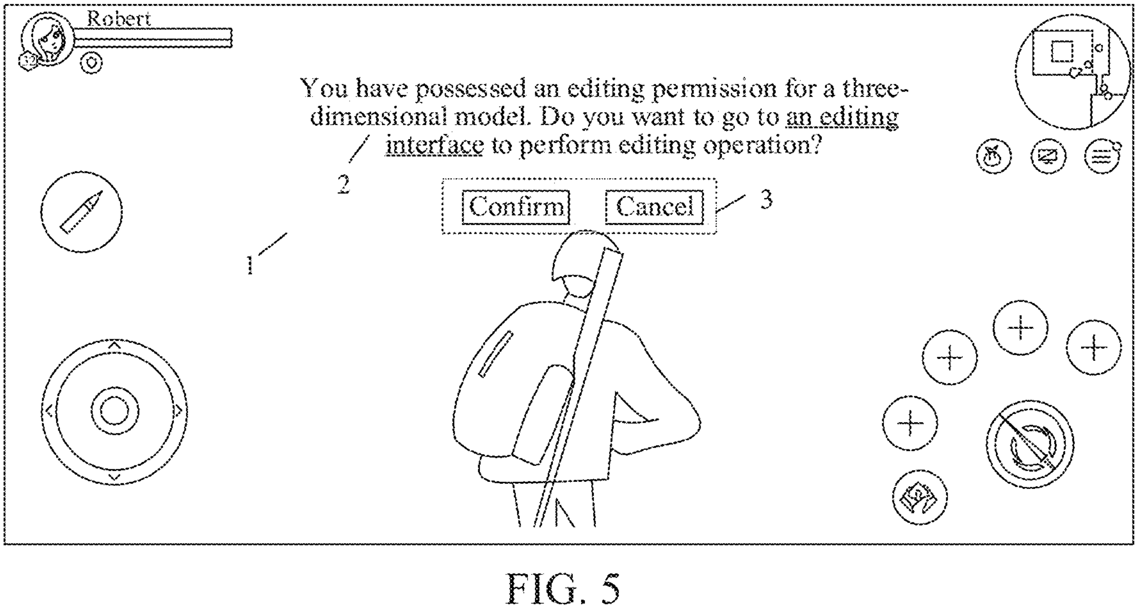
FIG. 5 is a schematic diagram of editing prompt information according to an embodiment of this application.

For example, referring to FIG. 5, FIG. 5 is a schematic diagram of editing prompt information according to an embodiment of this application. In the figure, a shooting game is used as an example. When interaction performance of a virtual object A controlled by a player U enables the virtual object A to have an editing permission for a three-dimensional model of the virtual object A, a floating layer (window) of prompt information shown in reference numeral 1, "You have possessed an editing permission for the three-dimensional model. Do you want to go to an editing interface to perform editing operation?" shown in reference numeral 2, and a "confirm" control and a "cancel" control shown in reference numeral 3 pop up. The player U clicks the "confirm" control, and a terminal receives an editing instruction for the three-dimensional model.

An editing condition for the three-dimensional model is described. In some embodiments, the terminal may determine that the editing condition for the three-dimensional model is satisfied in the following manner: When at least one of the following is satisfied, the terminal determines that the editing condition for the three-dimensional model is satisfied: interaction performance of a virtual object in a virtual scene is obtained, and the interaction performance reaches a performance threshold; or a virtual resource of the virtual object in the virtual scene is obtained, and a virtual resource size reaches a resource size threshold.

During actual implementation, the editing condition for a player to editing a three-dimensional model of the player may be that the interaction performance of the virtual object in the virtual scene reaches the performance threshold, or the virtual resource size of the virtual object in the virtual scene reaches the resource size threshold. The virtual resource may be a resource such as a virtual item, a virtual substance, or a virtual vehicle purchased by the player. When a total virtual value of virtual resources of the player reaches a value threshold, it may represent that the editing condition configured for editing the three-dimensional model of the players is satisfied.

Operation 102: Construct a target three-dimensional model of the virtual object on an editing interface.

The terminal constructs the target three-dimensional model of the virtual object on the editing interface, in other words, the terminal determines, based on the editing interface, the target three-dimensional model of the virtual object edited by a target object.

During actual implementation, based on the editing interface presented by the terminal for editing the three-dimensional model, the player can perform editing operation for the three-dimensional model of the virtual object in the editing interface, the editing operation including at least an editing operation for a character model of the three-dimensional model, an editing operation for a border model of the three-dimensional model, and an editing operation for each information component of the three-dimensional model. After the editing operation is performed, the target three-dimensional model of the virtual object may be obtained. In some embodiments, a performing sequence of the editing operation on the character model, the editing operation on the border model, and the editing operation on the information component may be set freely based on a preference or habit of the user.

In some embodiments, the terminal may implement the editing operation for the character model of the three-dimensional model in the following manner: The terminal receives a character editing instruction for the character model based on the editing interface, the character instruction being configured to instruct to edit character content of the character model, and the character content including at least one of the following: a material, a posture, or an item; in response to the character editing instruction, displays at least one candidate character content corresponding to the character content; and in response to a selection instruction for the candidate character content, determines selected candidate character content as target character content of the character model, to obtain a target three-dimensional model having the target character content.

During actual implementation, the terminal displays the editing interface for editing the three-dimensional model in response to the editing instruction for the three-dimensional model. Because the editing interface is configured for editing each part (a part such as the character model, the border model, or the information component) of the three-dimensional model, an editing control corresponding to each part of the three-dimensional model may be displayed in the editing interface, including an editing control corresponding to the character model, an editing control corresponding to the border model, or an editing control corresponding to the information component. The terminal receives an editing instruction for a related part of the three-dimensional model triggered by a triggering operation of the player for each editing control. If the player triggers the editing control corresponding to the character model, the terminal receives the character editing instruction of the character model for the three-dimensional model, the character editing instruction being configured to instruct the player to edit the character content for the character model. The character content that may be edited for the character model includes the material, the posture, and the item. The material is a character material (such as a gold material, a silver material, or a diamond material) of the character model. The posture is a target operation performed by the character model when the three-dimensional model is displayed (also referred to as entered). The item is a virtual item (such as a hand-held shooting item and a hand-held throwing item) carried by the character model when the three-dimensional model is displayed. If the player triggers the editing control corresponding to the border model, the terminal receives a border editing instruction of the border model for the three-dimensional model. The editing operation for the border model may include modifying a border shape, a border material, or the like of the border model. If the player triggers the editing control corresponding to the information component, the terminal receives the editing instruction for the information component. The terminal displays, in response to the edit instruction of each part of the three-dimensional model, at least one candidate content corresponding to each part: displaying, in response to the character editing instruction, at least one candidate character content corresponding to the character content; displaying, in response to the border editing instruction, at least one candidate border corresponding to the border model; or displaying, in response to the editing instruction of the information component, at least one candidate object information related to the virtual object. Finally, the terminal controls, in response to the selection operation for the candidate content, the three-dimensional model to have corresponding target (candidate) content.

Figure 6:
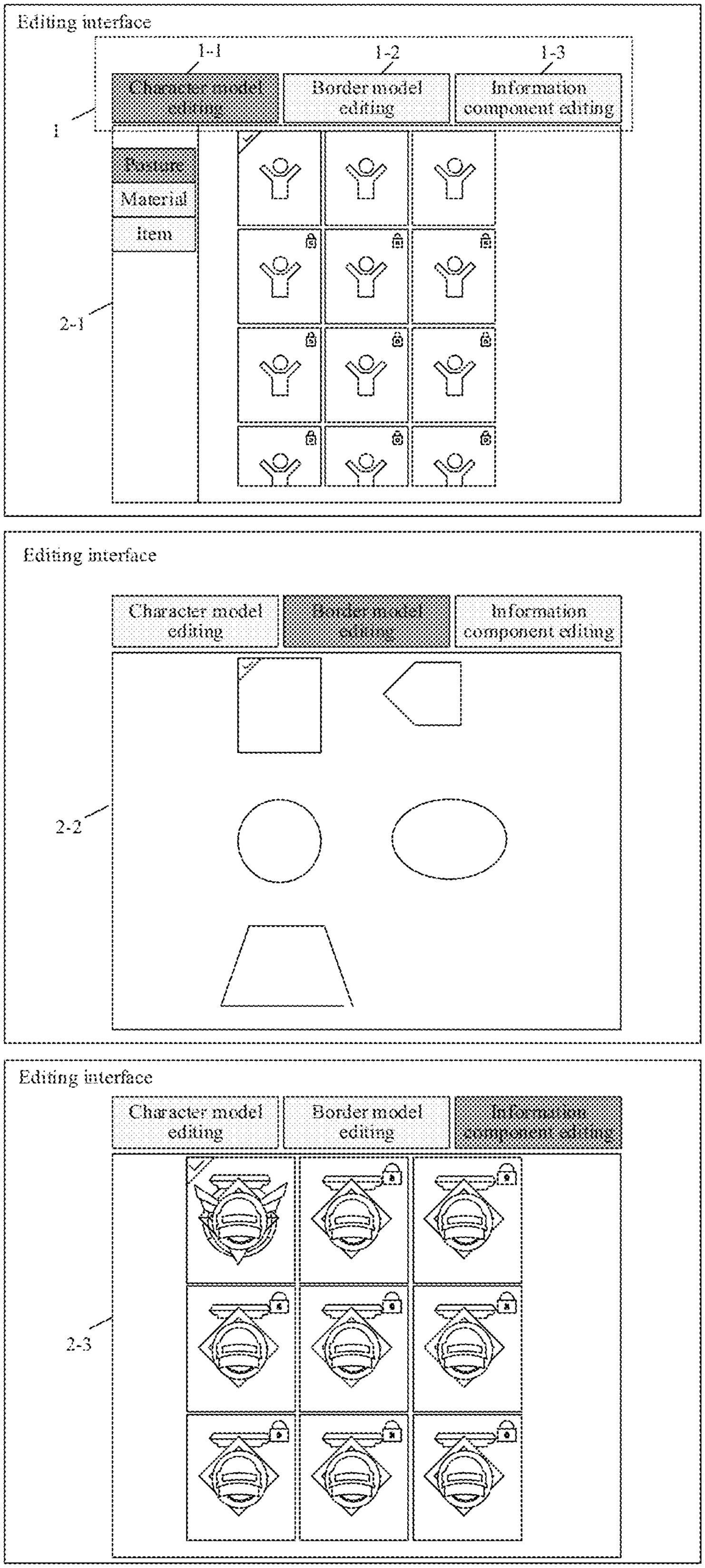
FIG. 6 is a schematic diagram of an editing interface of a three-dimensional model according to an embodiment of this application.

For example, referring to FIG. 6, FIG. 6 is a schematic diagram of an editing interface of a three-dimensional model according to an embodiment of this application. Reference numeral 1 shows an editing control corresponding to each part of the three-dimensional model. Reference numeral 1-1 shows an editing control of a character model. Reference numeral 1-2 shows an editing control of a border model. Reference numeral 1-3 shows an editing control of an information component. Reference numeral 2-1 shows candidate character content corresponding to the character model. Reference numeral 2-2 shows a candidate border model. Reference numeral 2-3 shows a candidate information component (an information component of a medal shown in the figure). By default, when an editing interface is opened, a candidate content presentation area presents the candidate content of the character model by default (content shown as 2-1 in the figure).

A triggering manner for a character editing instruction is described. In some embodiments, a terminal may receive the character editing instruction in the following manner: The terminal displays a content editing control of the character model in the editing interface, the content editing control including a material control configured for editing a material of the character model, a posture control configured for editing a posture of the character model, and an item control configured for editing an item of the character model; and receives the character editing instruction for the character model in response to a triggering operation for the content editing control. In other words, the editing control may be set for a material, a posture, or an item of the character model respectively, so that a player may independently edit each dimension of the character model based on the editing control. Therefore, editing of each dimension of the character model is decoupled, and editing efficiency for each dimension is improved.

During actual implementation, because an editing operation for the character model in the three-dimensional model may include an editing operation of “character content-material”, an editing operation of “character content-posture”, and an editing operation of “character content-item”, the player may trigger a corresponding content editing control for different character content, and trigger a character editing instruction corresponding to the corresponding content. The content editing control may include the material control configured for editing the material of the character model, the posture control configured for editing the posture of the character model, and the item control configured for editing the item of the character model. The terminal may receive, in response to a triggering operation for at least one content editing control of the player, the character editing instruction for editing the corresponding character content. The terminal may receive a character editing instruction triggered for the material control, a character editing instruction triggered for the posture control, and a character editing instruction triggered for the item control.

Figure 7:
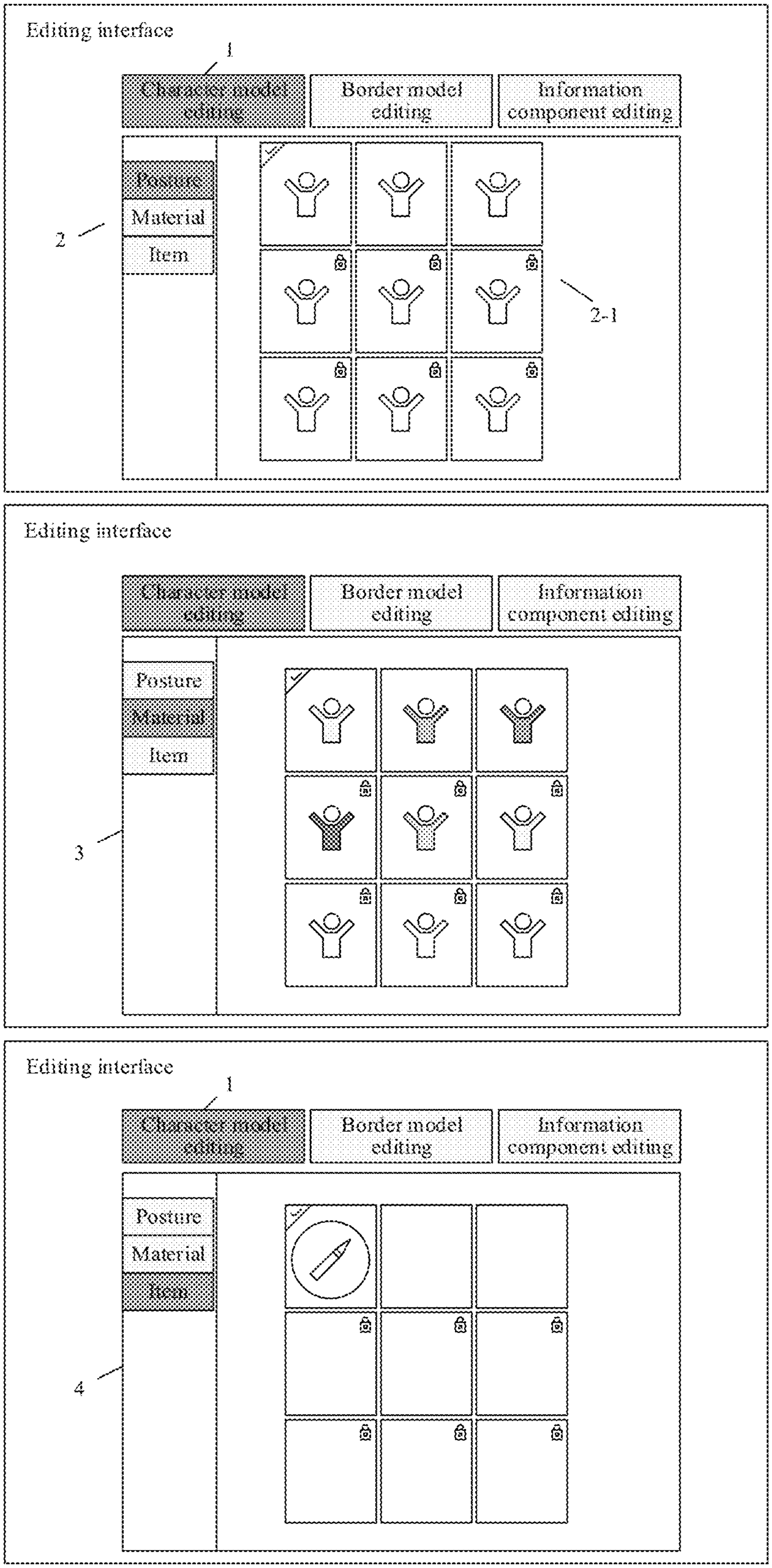
FIG. 7 is a schematic diagram of candidate character content according to an embodiment of this application.

Taking the foregoing example, referring to FIG. 7, FIG. 7 is a schematic diagram of candidate character content according to an embodiment of this application. A player clicks an editing control (the “character model editing” control shown in FIG. 1) of a character model to receive a character editing instruction for the character model. Reference numeral 2 shows at least one posture selection option corresponding to “character content-posture”. Reference numeral 3 shows at least one selection option corresponding to “character content-material”. Reference numeral 4 shows at least one item selection option corresponding to “character content-item”.

In some embodiments, when a preview area of the character model is included in an editing interface, a terminal may receive the character editing instruction for the character model of a three-dimensional model in the following manner: The terminal displays a preview image of the character model in the preview area of the character model; receives the character editing instruction in response to a triggering operation for a target part in the preview image, the character editing instruction being configured to instruct to edit character content corresponding to the target part, and different parts in the preview image corresponding to different character content.

During actual implementation, the editing interface configured for editing the three-dimensional model of a virtual object may include the preview area for previewing the character model, and display the preview image of the three-dimensional model in the preview area. During actual application, the preview area presents the preview image in a shape consistent with an appearance of the three-dimensional model, and different parts of the preview image corresponds to different parts of the three-dimensional model. When the editing interface is opened, a current three-dimensional model of the virtual object (an unedited three-dimensional model) may be displayed in the preview area. The three-dimensional model may be previewed in a form of a two-dimensional image in the preview area, or the three-dimensional model may be previewed directly. An edited three-dimensional model displayed in the preview area is consistent with a target three-dimensional model presented at a presentation position of the virtual scene. In this case, display resources of an electronic device are fully utilized, so that the player may preview the edited three-dimensional model through the preview area in real-time in an editing process of the three-dimensional model, to adjust edited content based on a previewed three-dimensional model.

Figure 8:
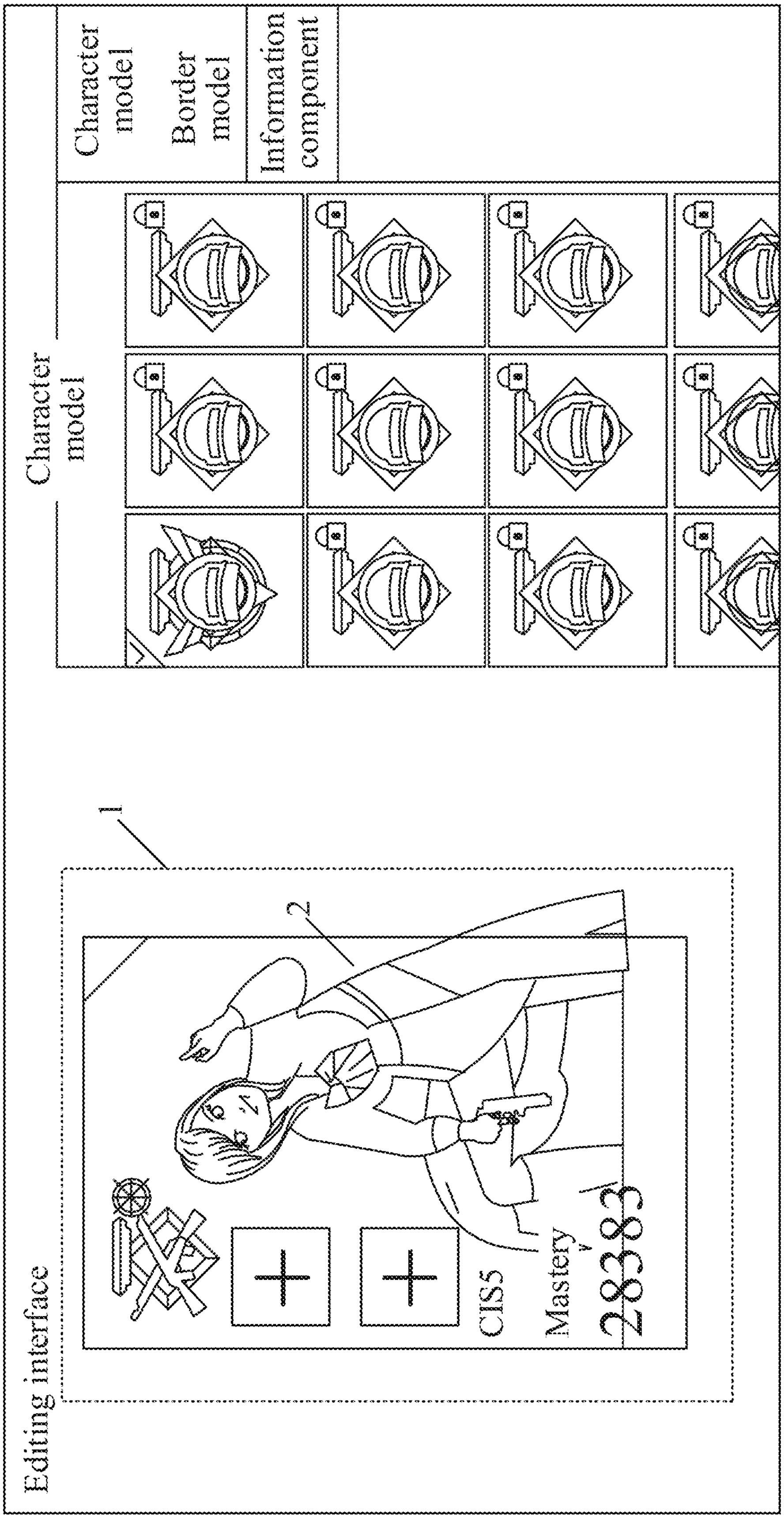
FIG. 8 is another schematic diagram of an editing interface of a three-dimensional model according to an embodiment of this application.

For example, referring to FIG. 8, FIG. 8 is another schematic diagram of an editing interface of a three-dimensional model according to an embodiment of this application. In the figure, a preview area (shown as reference numeral 1) for previewing a three-dimensional model is included in an editing interface. A player clicks a character model (shown as reference numeral 2) in the preview area, to trigger an editing operation for the character model. A terminal receives a character editing instruction for the character model. In this case, a part of the character model in the preview area is in a selected state (that is, get focus is highlighted).

In some embodiments, the terminal may display at least one candidate character content corresponding to character content in the following manner: when the character content includes a posture, displaying a plurality of candidate postures; in response to a selection instruction for at least two candidate postures, determining a selected candidate posture as a target posture of the character model; correspondingly, the terminal presents, at a presentation position of the three-dimensional model in the virtual scene, a process in which the target three-dimensional model of the virtual object performs the target posture in sequence.

During actual implementation, if the character editing instruction received by the terminal is triggered based on a posture control, the plurality of candidate postures are displayed in a displaying interface, and at least two candidate postures may be selected from the plurality of candidate postures as the target postures of the character model. In other words, the character model may correspond to one posture or a plurality of postures. When the character model corresponds to one posture, when an edited three-dimensional model is displayed, and when the three-dimensional model is entered (shown at first time), a process of the posture executed by the character model of the edited three-dimensional model is presented. When the character model corresponds to the plurality of postures, a selection sequence when the plurality of postures are selected may be used as an execution sequence of the plurality of postures. When the edited three-dimensional model is displayed, and when the three-dimensional model is entered (shown at first time), based on the foregoing execution sequence, a process of the plurality of postures executed by the character model of the edited three-dimensional model is presented in sequence.

For example, referring to FIG. 7, reference numeral 2 shown in FIG. 7 shows that a character editing instruction triggered based on a “Posture” control is received. The instruction is configured for editing “character content-posture” of a character model. Reference numeral 2-1 shows at least one candidate posture, a player may select one or more target postures from a plurality of candidate postures shown in the figure, so that an edited three-dimensional model (a target three-dimensional model) may present a process of executing a corresponding posture during presentation.

In some embodiments, when a preview area of the character model is included in an editing interface, a terminal may display a preview image of the character model in the following manner: In response to a selection instruction for candidate character content displayed in the editing interface, the terminal displays, in the preview area of the character model, a preview image of a character model having target character content.

During actual implementation, when the preview area is included in the editing interface, the terminal receives a character editing instruction corresponding to different character content, and displays at least one candidate character content corresponding to current character content. The player selects target character content from the at least one candidate character content, and displays the character model having the target character content in the preview area. In this case, when a target object has a plurality of characters in the virtual scene, when a three-dimensional model is edited, the plurality of characters are presented for a user to autonomously select a to-be-edited character.

Figure 9:
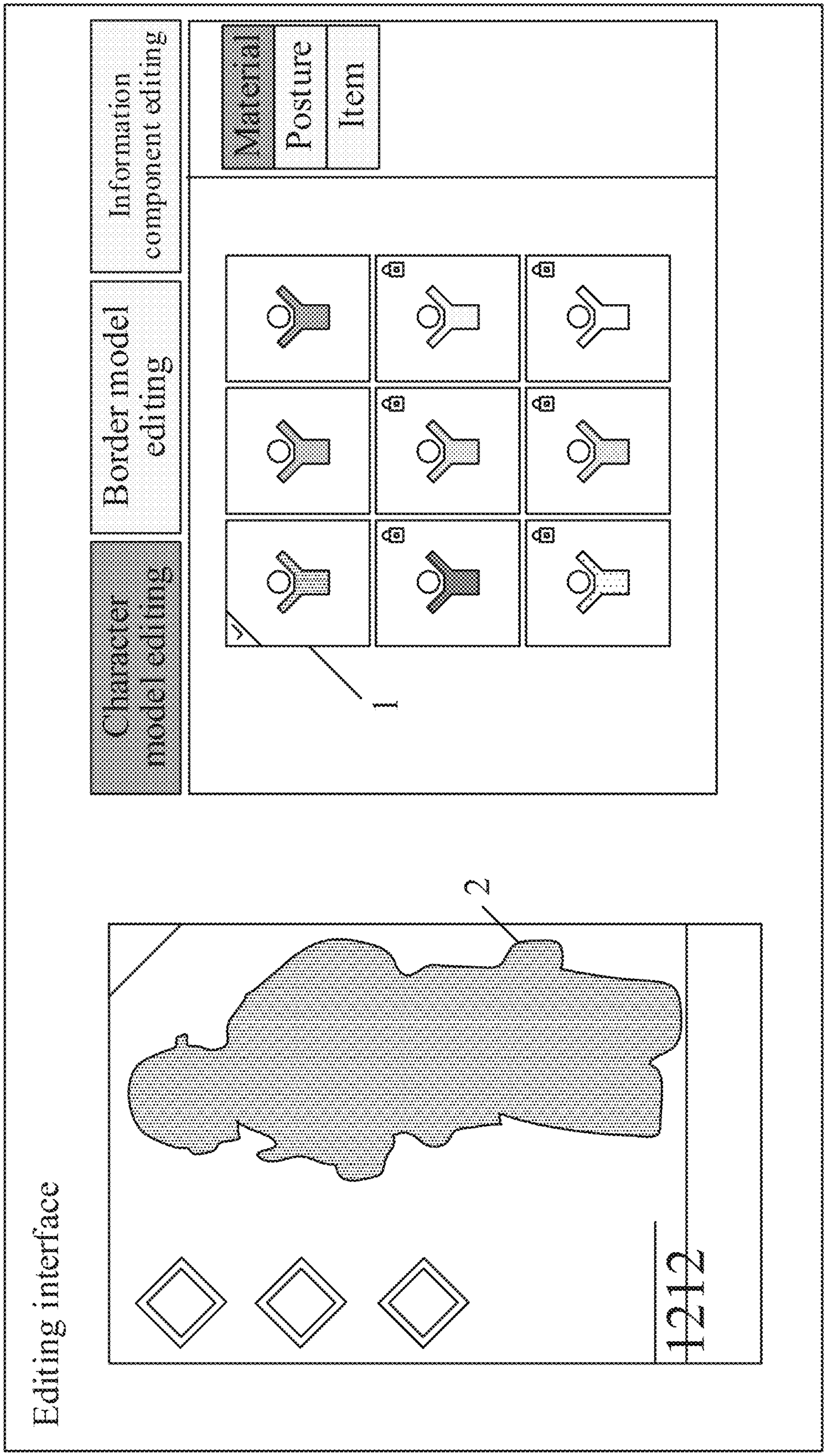
FIG. 9 is a schematic diagram of different character content according to an embodiment of this application.

For example, referring to FIG. 9, FIG. 9 is a schematic diagram of different character content according to an embodiment of this application. In the figure, a player triggers a “material” control. A terminal receives a character editing instruction based on “character content-material”; displays a plurality of different materials; and when a material shown in reference numeral 1 is selected, sets a material of a character model shown in a preview area reference numeral 2 as a selected “gold” material when it is assumed that a selected material is a “gold” material. The terminal receives the character editing instruction based on “character content-item”, and displays a plurality of different items (different sizes, different models of hand-held shooting items, hand-held throwing items, and the like). If a “bow arrow” is selected as a target item of the character model, the character model carrying an item “bow arrow” may be presented in a preview area. The terminal receives the character editing instruction based on the “character content-posture", displays a plurality of different postures (postures such as "wave" and "bend"), selects a target posture (such as "wave") from the plurality of different postures, and displays a process in which the character model executes the target posture (such as "wave") in the preview area.

In some embodiments, the terminal may edit a border model of a three-dimensional model in the following manner: The terminal receives a border editing instruction for the border model based on the editing interface, the border editing instruction being configured to instruct to edit the border model; displays at least one candidate border model in response to the border editing instruction; and determines a selected candidate border model as a target candidate border model in response to a selection instruction for the candidate border model, to obtain a target three-dimensional model having the target candidate border model.

During actual implementation, because the three-dimensional model further includes the border model, in the editing interface, the border model may also be edited, and an editing process is as follows: The terminal receives the border editing instruction for the border model, displays at least one candidate border model in the editing interface, selects the target border model from a plurality of candidate border models, and controls a current border model of the three-dimensional model to be changed to a selected target border model. When the preview area is included in the editing interface, the three-dimensional model having the target border model may also be previewed in the preview area.

For example, referring to FIG. 6, a player performs a triggering operation for a "border model editing" control. A terminal receives a border editing instruction for editing a border model, presents at least one candidate border model shown in reference numeral 2-2 in the figure (the candidate border model is a three-dimensional border model) in an editing interface, and in response to a selection operation for a first "rectangular" three-dimensional border model, may control the border model shown in reference numeral 1-2 in FIG. 4 to be switched to a selected three-dimensional border model.

In some embodiments, the terminal may receive the border editing instruction for the border model in the following manner: The terminal displays, in the editing interface, the border editing control corresponding to the border model; and receives the border editing instruction for the border model in response to a triggering operation for a border editing control.

During actual implementation, the border editing control corresponding to the border model may be displayed in the editing interface, the player triggers (such as "click") the border editing control. The terminal receives the border editing instruction for the border model, and performs the editing operation of the border model for the three-dimensional model based on the border editing instruction.

For example, referring to FIG. 6, in an editing interface for editing a three-dimensional model in the figure, reference numeral 1-2 shows a "border model editing" control in the editing interface. A player clicks the "border model editing" control. A terminal receives a border editing instruction for a border model.

In some embodiments, when a preview area of the border model is included in the editing interface, the terminal may preview a selected border model in the following manner: The terminal displays at least one candidate border model in response to a received border editing instruction; displays a selected candidate border model in a preview area of the border model in response to a selection instruction for the candidate border model.

During actual implementation, in the editing interface displayed by the terminal, a preview area configured for previewing the border model may be included. The terminal may directly display at least one candidate three-dimensional border model for a current three-dimensional model in the editing interface in response to the received border editing instruction. The terminal receives a selection operation of a user for the candidate three-dimensional border model, and may display a selected candidate three-dimensional border model in the preview area of the border model.

Figure 10:
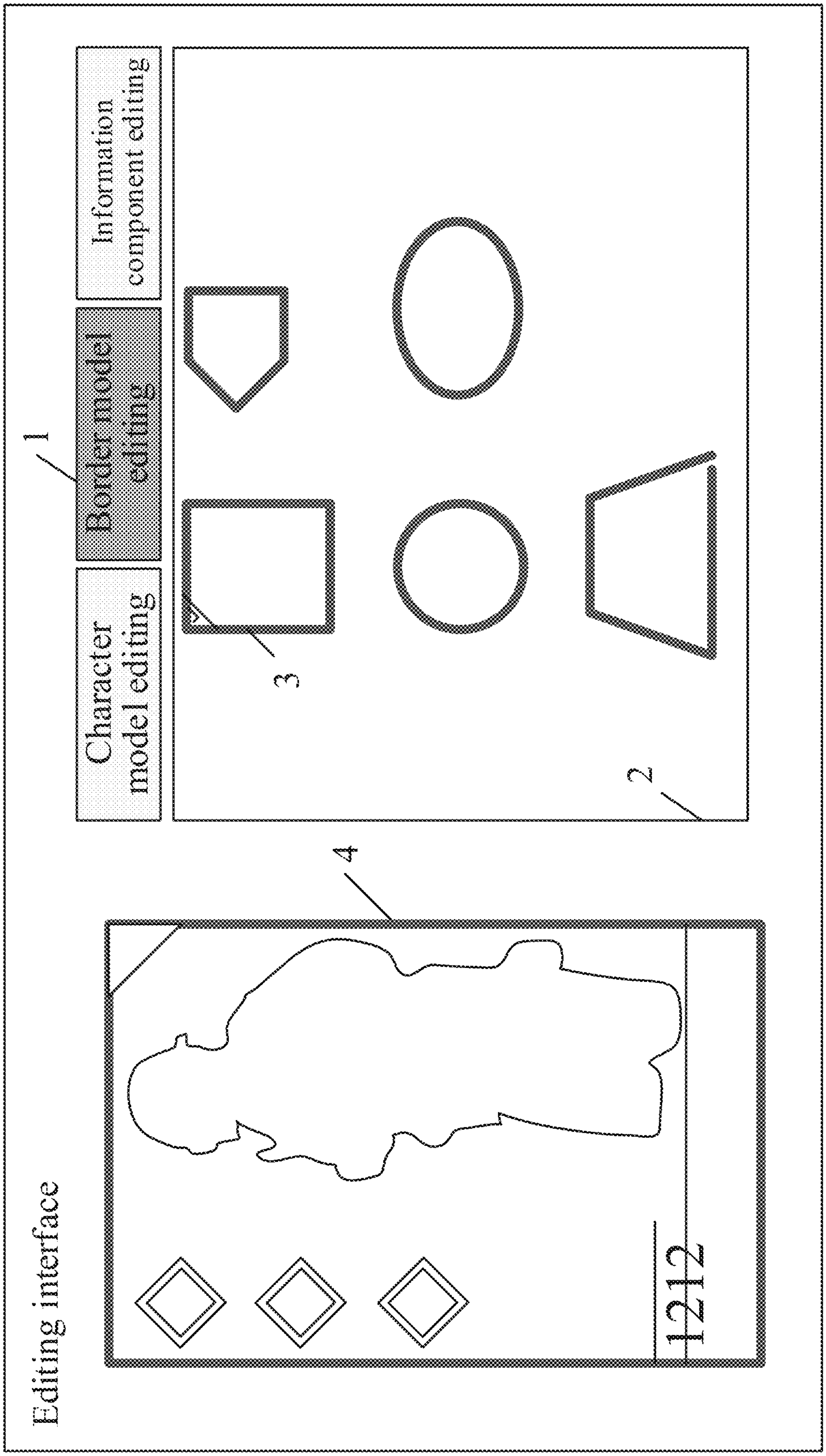
FIG. 10 is a schematic diagram of a border model of a three-dimensional model according to an embodiment of this application.

For example, referring to FIG. 10, FIG. 10 is a schematic diagram of a border model of a three-dimensional model according to an embodiment of this application. A player triggers a "border model editing" control shown in reference numeral 1. A terminal receives a border editing instruction for a border model of a three-dimensional model, and displays at least one candidate three-dimensional border model shown in reference numeral 2 in an editing interface. In response to a selection operation of the player for the candidate three-dimensional border model shown in reference numeral 3, the terminal presents a selected candidate three-dimensional border model shown in reference numeral 4 in a preview area.

In some embodiments, after the terminal displays the selected candidate border model in the preview area of the border model, the terminal may display an information component of the three-dimensional model in the following manner: The terminal displays at least one addition bit of the information component on the candidate border model in the preview area of the border model; displays at least one object information of a virtual object in response to a triggering operation for the addition bit; and displays an information component corresponding to the object information on the addition bit in response to a selection operation for the object information.

During actual implementation, the three-dimensional model of the virtual object may further include at least one information component, the information component being carried on the border model, the information component being configured for displaying the object information of the virtual object, and the information component also being three-dimensional. When the preview area is included in the editing interface, the preview area may further include at least one addition bit for previewing the information component, and each information component in the three-dimensional model may find a corresponding addition bit in the preview area. Each addition bit in an idle state has an addition event and each addition bit in an occupied state has a delete event. The addition event is that the addition bit may be clicked to receive an addition instruction triggered for the information component. The delete event is a delete instruction that may be received and that is for the information component when the addition bit has the information component (or an image of the information component). In addition, to increase the information component, a quantity of addition bits in the preview area is greater than or equal to a quantity of information component in the three-dimensional model. For example, the three-dimensional model before editing includes three information components, and in an editing process, a quantity of addition bits corresponding to the information component is greater than or equal to three in the preview area. In this case, the quantity of information component in an edited three-dimensional model may be increased.

Figure 11:
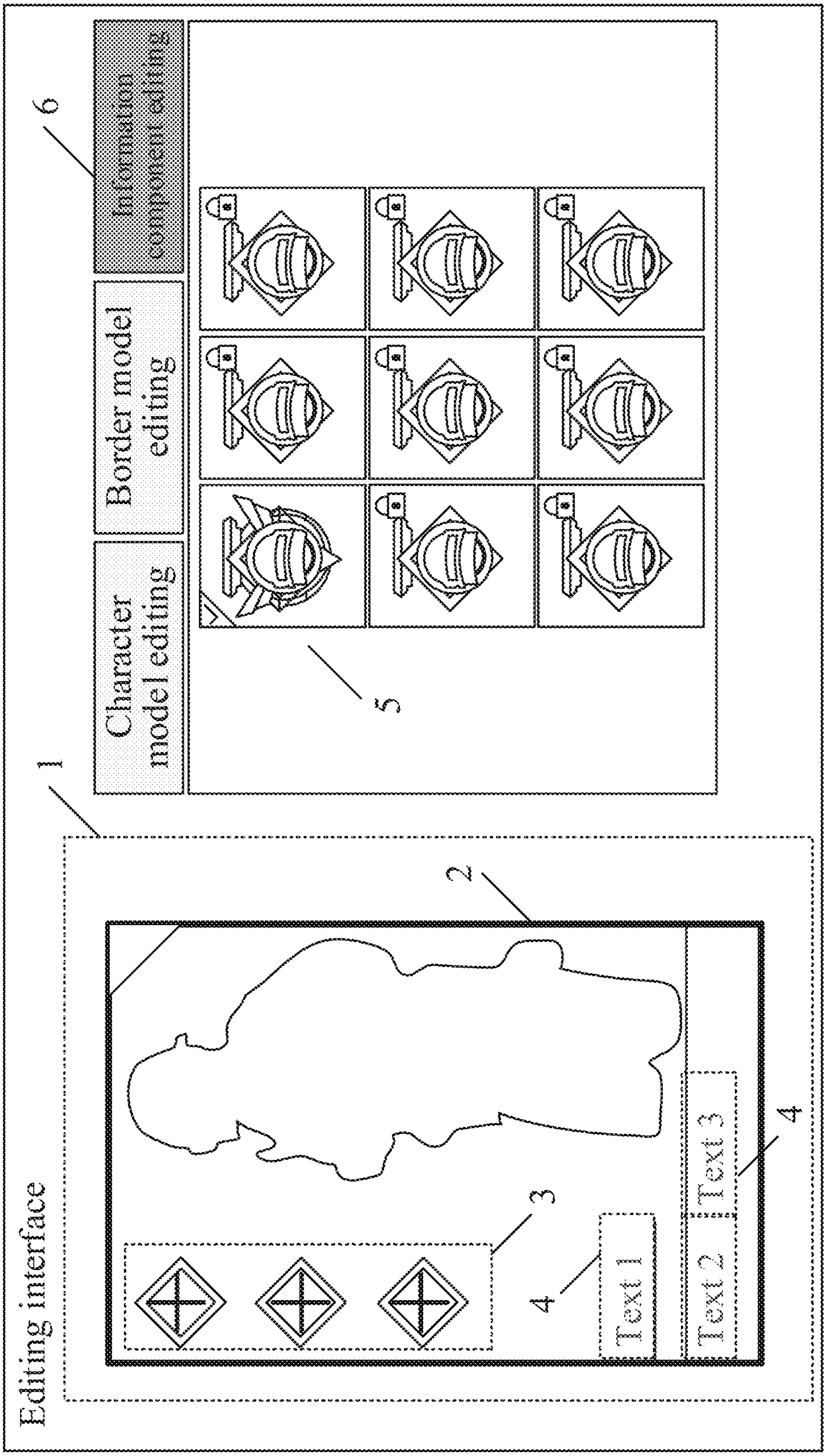
FIG. 11 is a schematic diagram of information component editing according to an embodiment of this application.

For example, referring to FIG. 11, FIG. 11 is a schematic diagram of information component editing according to an embodiment of this application. Reference numeral 1 shows a preview area for a three-dimensional model. Reference numeral 2 shows a preview area for a border model. Reference numeral 3 shows an addition bit for an information component carrying the border model. Reference numeral 4 shows an addition bit for an information component carrying three-dimensional text information. The addition bit shown in reference numeral 3 is in an idle state. A player clicks the addition bit to present at least one object information (such as a killing point) of a virtual object in an editing interface. When the addition bit is in an occupied state, the player clicks an image of the information component of the addition bit, and displays a "delete" control. A terminal receives a triggering operation for the "delete" control, and deletes a current information component (or the image) on the addition bit, so that the addition bit is in the idle state again.

In some embodiments, after the terminal displays a selected candidate border model in the preview area of the border model, the terminal may display the information component of the three-dimensional model in the following manner: The terminal displays an editing control configured for editing the information component in the editing interface; displays at least one object information of a virtual object in response to a triggering operation for the editing control; and in response to a selection operation for the object information, determines an information component corresponding to the object information as the information component of the border model in a target three-dimensional model.

During actual implementation, the editing interface for the three-dimensional model further includes the editing control configured for editing the information component. The terminal receives a triggering operation of the player for the editing control, displays a plurality of types of object information of the virtual object, and selects target object information, to generate an information component corresponding to the target object information as an information component carried by the border model in the target three-dimensional model. The terminal may switch the object information represented in a form of a two-dimensional text or an image into the information component represented in a form of a three-dimensional text or the image, and carry the information component on the border model. A carrying manner may be that the information component is mounted on the border model, may be that the information component is attached to the border model, or the like. If an application client is applied to different text languages (Chinese, English, Korean, and the like), that is, the player comes from different countries, the object information in a form of a text in the information component may be switched into a target language corresponding to the player. For example, for a player A using Chinese, object information in a form of Chinese is displayed in the information component, and for a player B using Korean, object information in a form of Korean is displayed in the information component.

For example, referring to FIG. 11, in an editing interface for editing a three-dimensional model, an "information component editing" control shown in reference numeral 6 is displayed. A terminal receives an editing instruction for an information component in response to a triggering operation of a player for the control; displays at least one information component (the information component listed in the figure is a medal of a virtual object) shown in reference numeral 5; and displays a selected target information component on an addition bit in an idle state in a preview area in response to a selection operation for a target information component (a first medal).

During actual implementation, the terminal obtains an operation parameter of a pressing operation in response to the pressing operation for the addition bit in the preview area. The operation parameter includes at least one of press duration and a pressure value. For example, when the press duration reaches to a duration threshold, or the pressure value reaches to a pressure threshold, the addition bit is controlled to be in a levitation state. The terminal may custom adjust, in response to a moving operation for the addition bit that is in the levitation state, a position of a current addition bit related to a border model in a preview area of the border model. The terminal controls, in response to a release operation for the moving operation, the addition bit to be switched from the levitation state to a fixed state. In this case, the current addition bit is in a target position.

Through the foregoing editing interface, a finally determined three-dimensional model of the virtual object may present a three-dimensional character model, may further present the three-dimensional border model and a three-dimensional information component, and supports the player to implement a custom editing operation for the three-dimensional model. Therefore, a target three-dimensional model conforming to a demand of the player is finally obtained, a sense of showing off of the play for presenting the three-dimensional model of the player in the virtual scene is satisfied, and human-computer interaction efficiency is effectively improved.

A presentation condition of the three-dimensional model is described. In some embodiments, the terminal may determine the presentation condition of the target three-dimensional model in the following manner: The terminal obtains presentation time of the target three-dimensional model; and when the presentation time is arrived, determines that the presentation condition of the target three-dimensional model is satisfied; or the terminal displays a presentation control of the target three-dimensional model; and when the presentation control is triggered, determines that the presentation condition of the target three-dimensional model is satisfied.

The presentation time is described. In an actual implementation, presentation time of at least one (or at least two) fixed three-dimensional model may be set in the virtual scene. For example, the presentation time includes 10 a.m. and 3 p.m., and if current time is 11 a.m., when the presentation time arrives at 3 p.m., the presentation time is determined.

During actual implementation, based on the target three-dimensional model obtained in the editing interface for the three-dimensional model, the target three-dimensional model of the virtual object may be presented in the virtual scene when the corresponding presentation condition is satisfied. The presentation condition may be determining whether the presentation time of the three-dimensional model of the virtual object is arrived when the virtual scene starts (or game competition starts). When the presentation time is arrived, the terminal determines that the presentation condition of the target three-dimensional model is satisfied. The presentation condition may also be that the presentation control is displayed in the interface of the virtual scene. The terminal receives the triggering operation of the player for the presentation space, and determines that the presentation condition of the target three-dimensional model of the virtual object is satisfied.

Operation 103: Present the target three-dimensional model of the virtual object at the presentation position of the three-dimensional model in the virtual scene.

In an actual implementation, after determining an edited target three-dimensional model, the terminal may directly present the target three-dimensional model of the virtual object at the presentation position of the three-dimensional model in the virtual scene, and may also present the target three-dimensional model at the presentation position of the three-dimensional model in the virtual scene when the presentation condition of the target three-dimensional model of virtual object is satisfied.

During actual implementation, at least one presentation position for presenting the target three-dimensional model is preset in the virtual scene, and a display range (circular area) corresponding to the presentation position is determined with the presentation position as an origin and a preset distance as a radius. When the virtual object enters the display range of the presentation position, the target three-dimensional model is presented at the origin (presentation position) of the display range. When the virtual object has insufficient competition performance to present the corresponding target three-dimensional model of the virtual object in the virtual scene, and when the virtual object is in the display range of the presentation position, the target three-dimensional model of another virtual object having higher competition performance than the virtual object in the current virtual scene may also be presented.

Figure 12:
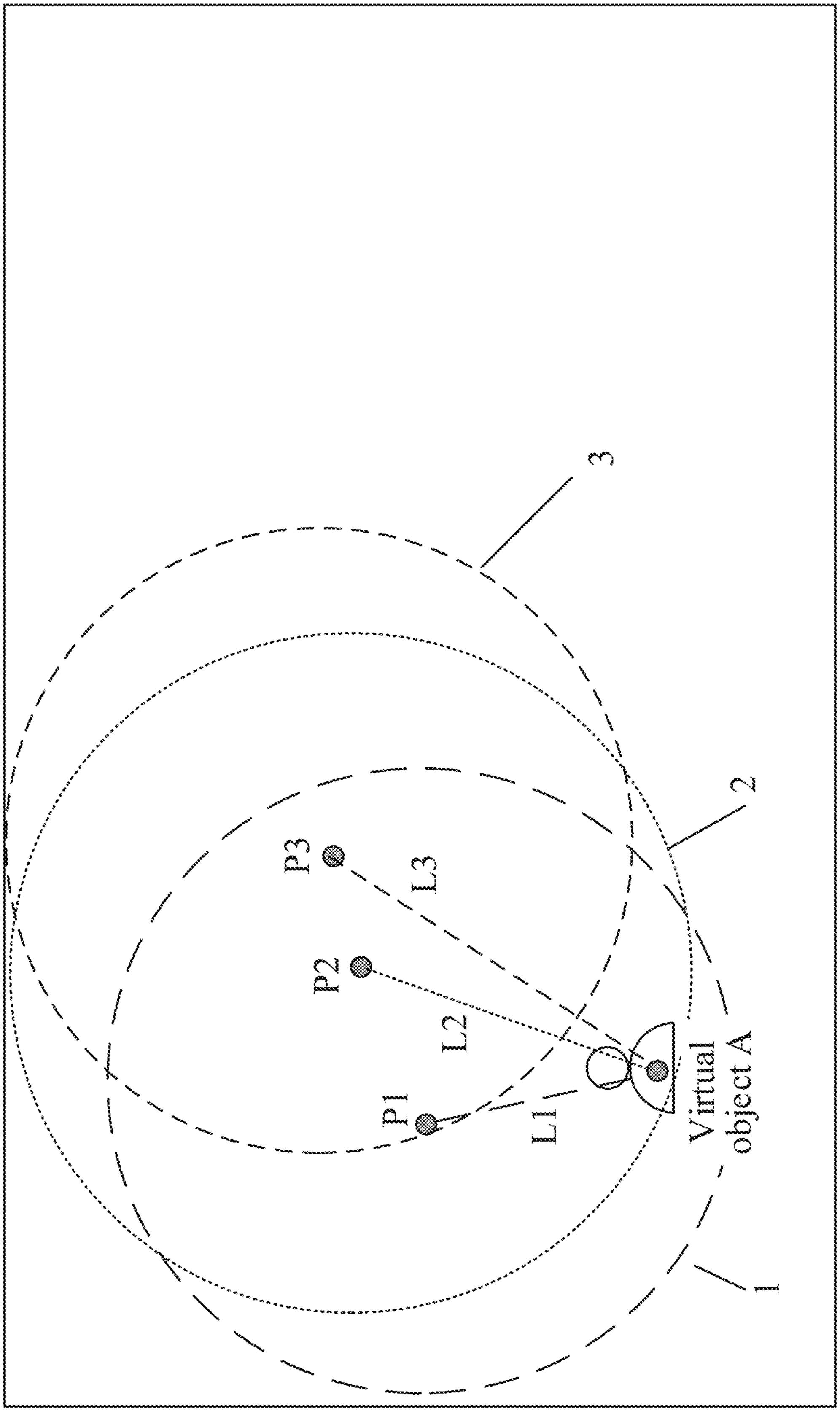
FIG. 12 is a schematic diagram of a presentation position in a virtual scene according to an embodiment of this application.

For example, referring to FIG. 12, FIG. 12 is a schematic diagram of a presentation position in a virtual scene according to an embodiment of this application. In the figure, there are three presentation positions P1, P2, P3 in the virtual scene. Reference numeral 1 shows a display range of the P1 presentation position. Reference numeral 2 shows a display range of the P2 presentation position. Reference numeral 3 shows a display range of the P3 presentation position. A distance of the virtual object A controlled by a player from the presentation positions P1, P2, P3 is L1, L2, L3 in sequence, and when the virtual object A is in the display range of the presentation positions P1, P2, the presentation position P1 having the shortest distance may be selected to present a target three-dimensional model of the virtual object. When the presentation position P1 is in an occupied state, the target three-dimensional model may be presented at the presentation position P2.

A manner of presenting the three-dimensional model in the virtual scene is described. In some embodiments, a terminal may present the target three-dimensional model of the virtual object in the virtual scene in the following manner: obtaining a position of the virtual object in the virtual scene when a quantity of presentation positions is at least two; selecting a nearest presentation position to the virtual object from the at least two presentation positions as a target presentation position based on the position of the virtual object in the virtual scene; and presenting the target three-dimensional model of the virtual object at the target presentation position.

During actual implementation, when the virtual object is in the display ranges corresponding to the at least two presentation positions, the presentation position at which the virtual object is the closest distance from the presentation position is selected as the target presentation position at which the three-dimensional model is presented.

For example, referring to FIG. 12, a virtual object A controlled by a player is simultaneously in a display range of a presentation position P1 and a presentation position P2. A distance L1 of the virtual object A from the presentation position P1 is calculated to be smaller than a distance L2 of the virtual object A from the presentation position P2, that is, L1<L2. In this case, when the presentation position P1 is used as a target presentation position at which a target three-dimensional model is presented, to be specific, the target three-dimensional model is presented at the presentation position P1.

In some embodiments, a terminal may present the target three-dimensional model of a virtual object in a virtual scene in the following manner: when a quantity of presentation positions is at least two, and the at least two presentation positions corresponding to two teams, determining presentation positions of the at least two presentation positions corresponding to the team to which the virtual object belongs; when a quantity of presentation positions corresponding to the team to which the virtual object belongs is at least two, generating duplicates of the target three-dimensional model; and presenting the corresponding duplicates of the target three-dimensional model respectively at the presentation positions corresponding to the team to which the virtual object belongs.

During actual implementation, when there are a plurality of presentation positions for displaying a three-dimensional model in the virtual scene, the plurality of presentation positions may also be grouped based on the team to which each virtual object being interacted with belongs in the virtual scene, to be specific, at least one presentation position is assigned to each team in the virtual scene, and the three-dimensional model of the virtual object may be presented at the presentation position corresponding to the team to which the virtual object belongs. When determining the presentation position corresponding to the three-dimensional model, the terminal obtains an idle state of each presentation position corresponding to the team to which the virtual object belongs; when there is a presentation position in the idle state (that is, no three-dimensional model is presented at the corresponding presentation position) of the presentation positions corresponding to the team, directly presents the three-dimensional model at the presentation position in the idle state; when all the presentation positions corresponding to the team are occupied, compares interaction performance of the another virtual object of a same team indicated based on the three-dimensional model at each presentation position with interaction performance of a current virtual object; and uses the presentation position at which the three-dimensional model of the another virtual object having the lowest interaction performance is located as the presentation position of the target three-dimensional model of the current virtual object.

In some embodiments, the terminal may present the target three-dimensional model of the virtual object in the virtual scene in the following manner: The terminal obtains virtual weather corresponding to the presentation position of the three-dimensional model in the virtual scene; and when target weather is based on the virtual weather, displays the target three-dimensional model in a blurring state at the presentation position of the three-dimensional model in the virtual scene.

In some embodiments, the target weather is a non-sunny day having visibility lower than a visibility threshold, such as a snowy day and a foggy day. During actual implementation, the terminal may also dynamically adjust presentation clarity of a virtual three-dimensional model based on the virtual weather at the presentation position for presenting the three-dimensional model in the virtual scene. When the virtual weather is sufficiently illuminated, a clear three-dimensional model is presented. When the virtual weather is the target weather (such as a cloudy day and a rainy day), clarity of the three-dimensional model is dynamically adjusted. The three-dimensional model in the blurring state is displayed at the presentation position of the three-dimensional model. During actual application, a blurring degree of the three-dimensional model in the blurring state may be inversely correlated with visibility in the virtual scene. In this case, visibility of the three-dimensional model presented in the virtual scene varies based on weather change, and this improves realism of a presentation effect of the three-dimensional model.

In some embodiments, the terminal may present the target three-dimensional model of the virtual object in the virtual scene in the following manner: after presenting the target three-dimensional model of the virtual object at the presentation position, the terminal receives a target operation performed by the target virtual object for the target three-dimensional model; and displays an operation result of the target operation in response to the target operation.

During actual implementation, in a process in which the target three-dimensional model is presented at the corresponding presentation position, after another virtual object in the virtual scene perform a target operation on the target three-dimensional model, the operation result corresponding to an operation of the target three-dimensional model may be presented. For example, when an enemy virtual object performs a destroying operation for the target three-dimensional model, a destroyed target three-dimensional model is presented (the three-dimensional model is incomplete at this time).

By applying the embodiments of this application, the target three-dimensional model of the virtual object can be finally obtained based on an editing operation for the three-dimensional character model, an editing operation for a three-dimensional border model, and a custom editing operation for at least one three-dimensional information component. The target three-dimensional model is presented at the presentation position in the virtual scene when the presentation condition for the target three-dimensional model is satisfied. In this case, it is changed based on a selected language, a competition situation, and performance of the player. Because a direct text and digital information can be quickly conveyed to the player, a presentation of high sense of showing off, a harmonious visual performance, and a low usage threshold are brought to the player.

The following describes an example application during actual application scenario in the embodiments of this application.

Figure 13:
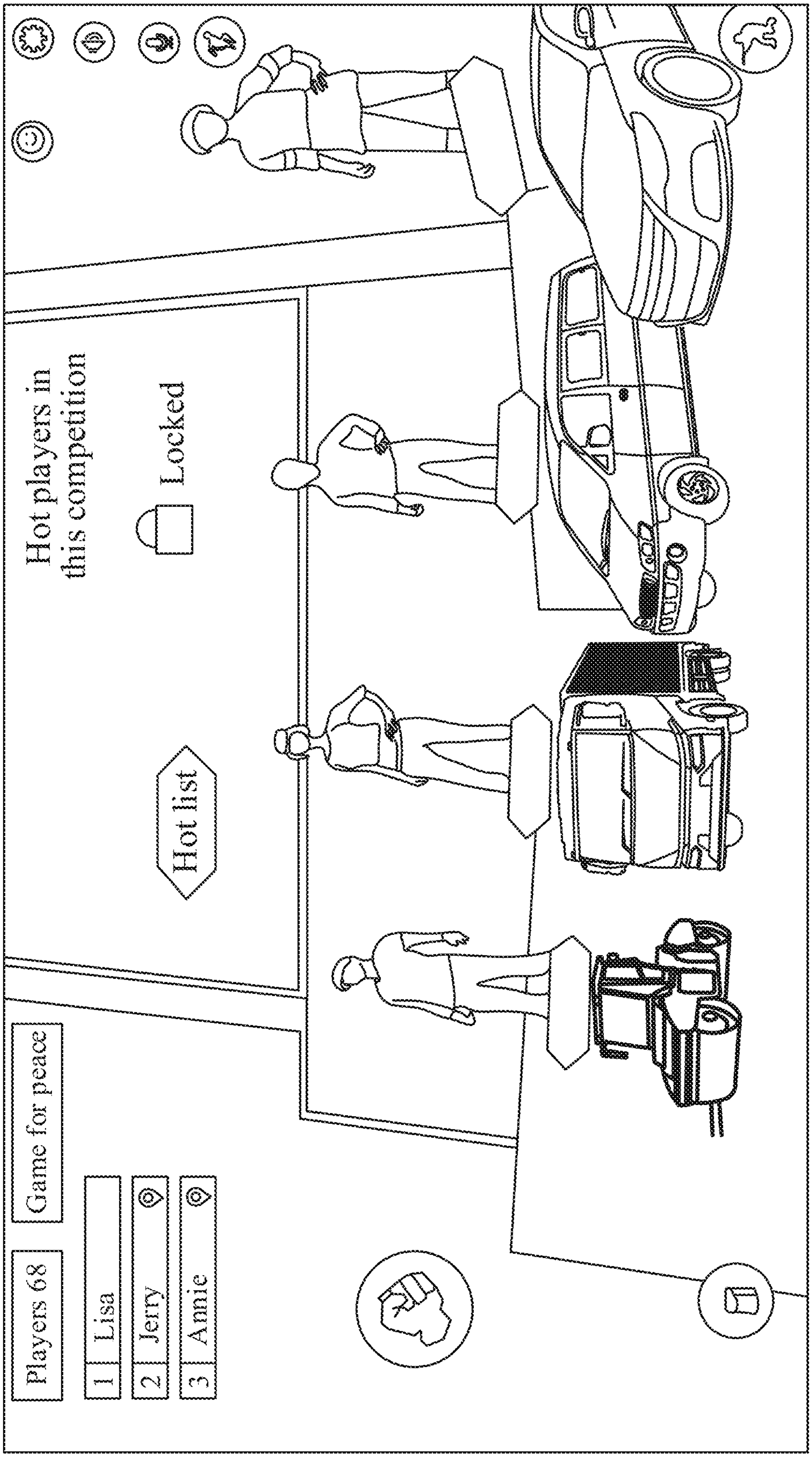
FIG. 13 is a schematic diagram of a display method of a three-dimensional model according to the related art.

In a related shooting game, to consider both computing performance of an electronic device and a presentation effect of a game scene, a three-dimensional model globally presented to a player is generally preset according to a particular rule, and supports a slight customization of the player in limited options. For example, referring to FIG. 13, FIG. 13 is a schematic diagram of a display method of a three-dimensional model provided in the related art. In the figure, a three-dimensional model corresponding to a virtual object controlled by a player and object information related to the virtual object (player) can be presented simultaneously in a virtual (game) scene. At a birth island stage before the game starts, generally, there is a fixed presenting table to project (display) a dynamic three-dimensional model of the player, and a name and hot value information of the player are presented by using an information card (name card). In this case, although a full character and part information of the player are displayed, content of a presented three-dimensional model and the information card are determined based on data when the player enters the game (the game starts), to be specific, the player cannot perform any custom operation of presenting content during the game, and this causes poor information interactivity.

Figure 14:
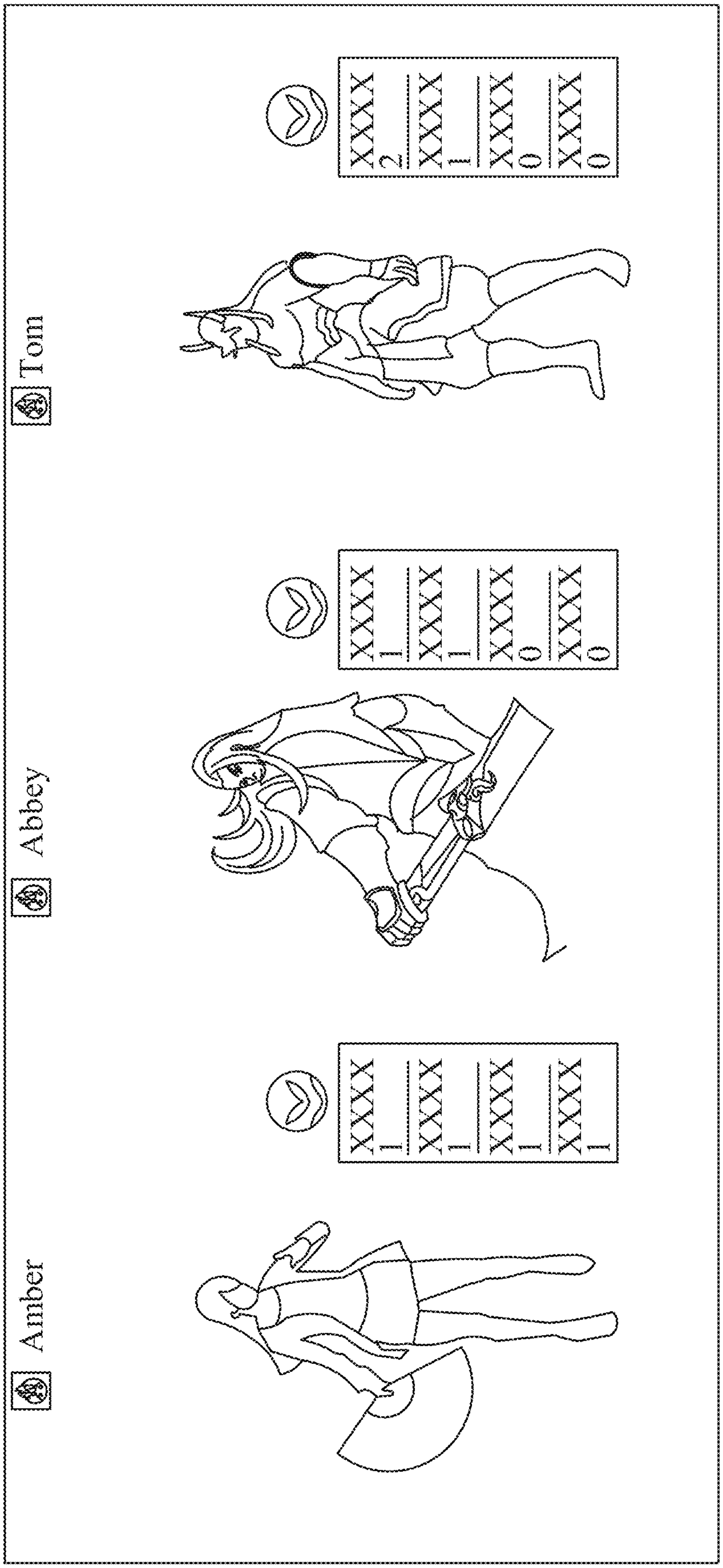
FIG. 14 is another schematic diagram of a display method of a three-dimensional model according to the related art.

For example, referring to FIG. 14, FIG. 14 is another schematic diagram of a display method of a three-dimensional model provided in the related art. In the figure, a three-dimensional model and related information are presented through a dedicated presentation interface, and the three-dimensional model and competition information (including performance information such as killing points) of the best performing team of players in game competition are presented. In this case, although the player may set corresponding information of the three-dimensional model outside the game, particular editing space is implemented. However, because the competition information in the game is directly attached to an interface through a two-dimensional text (or image) (2D UI), a sense of fragmentation between the competition information (two-dimensional information) of the player and the three-dimensional model of the player is strong, so that an entire presentation effect is poor.

Based on this, the embodiments of this application provide a method for processing data in a virtual scene. The virtual scene may be a shooting game scene. By combining a three-dimensional (3D) model, a three-dimensional text (or a three-dimensional image, a 3D UI), the method implements object information transmission of a virtual object in the virtual scene, supports a player to custom edit a three-dimensional virtual character model (also referred to as a character model) consistent with an appearance of a character, a corresponding border model, and an information component mounted on the border model, and finally generates a complete three-dimensional model. The method is that a terminal receives custom data sent by a game server of the virtual scene; and provides, by dynamically creating a Mesh or a UI in a fixed slot (each of the three-dimensional model in the preview area in the editing interface), possibility of autonomously editing a specified part of the three-dimensional model to the player. In this case, various playing designs and commercialization drop designs from upstream are allowed to be carried, to be specific, more flexible editing space and differentiation possibilities can be provided to the player. In addition, both a reduced performance cost and presentation by combining the three-dimensional model (3D model) and three-dimensional text information (including content such as a text and a number) are considered, to provide a presentation system that has a high sense of showing off, a harmonious visual performance, and a low usage threshold to the player.

The following describes a method for processing data in a virtual scene provided in the embodiments of this application from a display aspect of a product side.

First, projected content (a three-dimensional model that needs to be displayed) is determined. A projected player (the projected content is a dynamic 3D model of the player) may be a three-dimensional model corresponding to the player performing the best in previous games or performing better in competition. Corresponding determination logic may be adjusted by a game designer, but it needs to be ensured that remaining players may perform strategic deployment in the competition by using the information.

Figure 15:
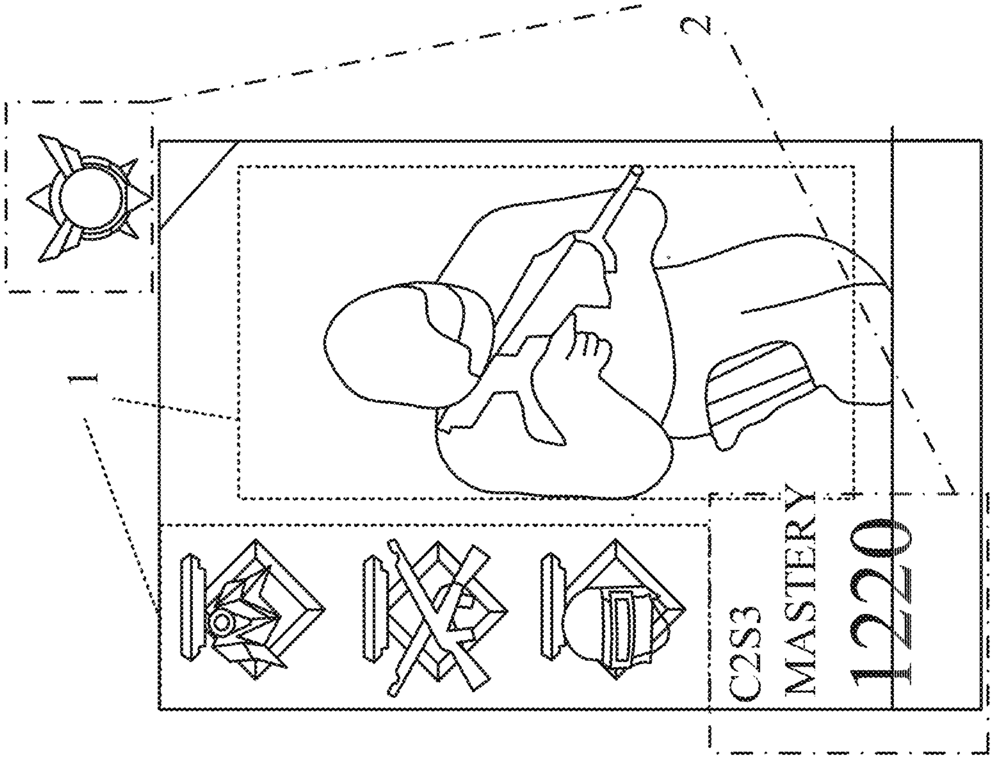
FIG. 15 is a schematic diagram of an edited three-dimensional model according to an embodiment of this application.

During actual implementation, referring to FIG. 9, an editing interface of a three-dimensional model (an editing interface for editing the three-dimensional model and a three-dimensional text (or image) set by a player off competition) is shown. In the figure, the player may edit presentation content of the three-dimensional (3D) model off the competition, and may preview an effect combining the 3D model and a 3D UI (that is, the three-dimensional model described above). For example, referring to FIG. 15, FIG. 15 is a schematic diagram of an edited three-dimensional model according to an embodiment of this application. Reference numeral 1 shows a 3D model of a player in a virtual scene. Reference numeral 2 shows 3D UI content associated with the 3D model.

Figure 16:
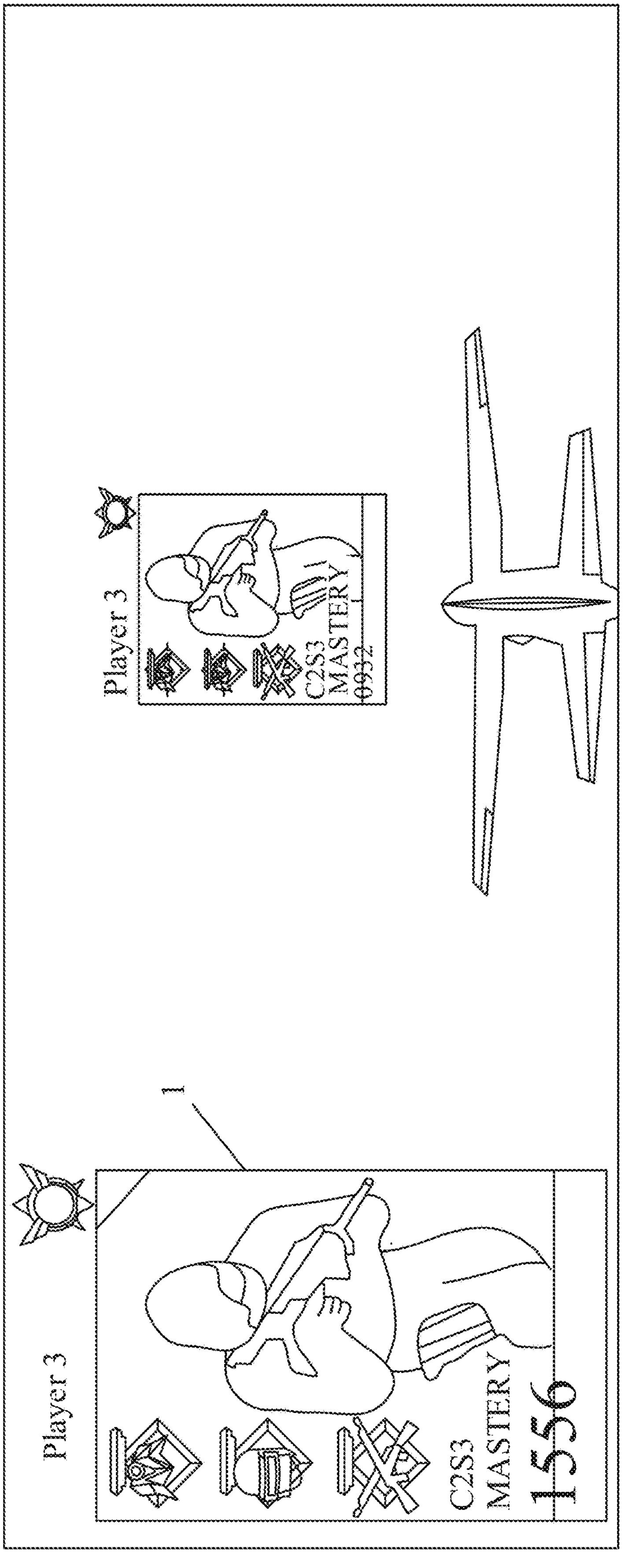
FIG. 16 is a schematic diagram of a three-dimensional model displayed in a game scene according to an embodiment of this application.

During actual implementation, when a shooting game starts, a virtual object controlled by the player enters the game, and when presentation time of the three-dimensional model of the virtual object controlled by the player is arrived, a 3D model content setting of the player and to-be-presented data information are pulled, the to-be-presented data information is changed from a 2D UI to the 3D UI, the 3D UI and the 3D model are combined into one entire model (that is, the three-dimensional model) for presentation, and entire model presentation is finally obtained. Referring to FIG. 16, FIG. 16 is a schematic diagram of a three-dimensional model displayed in a game scene according to an embodiment of this application. Reference numeral 1 shows a final composite three-dimensional model (may be referred to as a virtual statue of a player in a game scene) of a player 3.

An entire model (three-dimensional model) combining a 3D model and a 3D UI is presented in game competition, a word, a number, and an icon in the 3D UI may be changed based on a selected language, a competition situation, and performance. Because direct word information and data information can be quickly transmitted to the player, this provides a presentation system that has a high sense of showing off, a harmonious visual performance, and a low usage threshold to the player.

Figure 17:
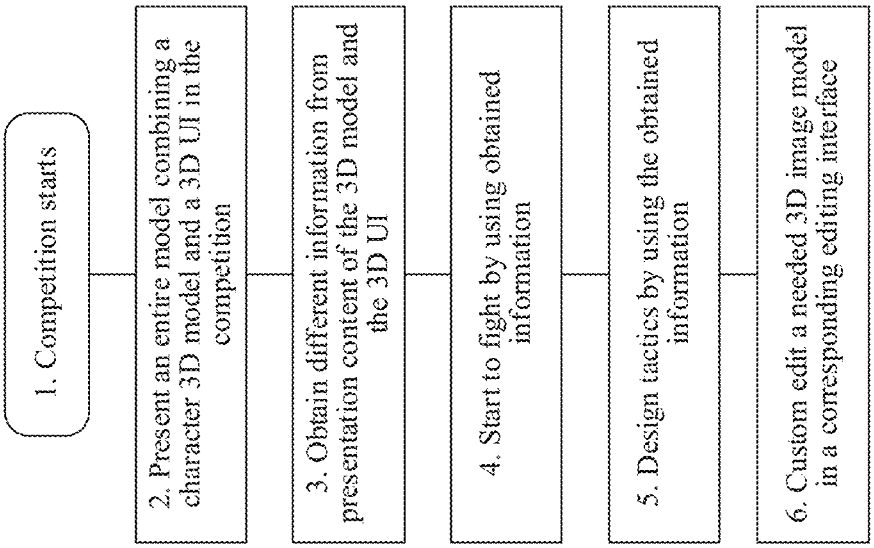
FIG. 17 is a flowchart of custom editing of a three-dimensional model according to an embodiment of this application.

During actual implementation, referring to FIG. 17, FIG. 17 is a flowchart of custom editing of a three-dimensional model according to an embodiment of this application. After operation 1: game competition starts, operation 2 is performed: Present an entire model combining a 3D model and a 3D UI (that is, the three-dimensional model of a player) in game competition. Then, operation 3 is performed: Obtain different information from presentation time of the 3D model and the 3D UI. Then, operation 4 is performed: Fight based on obtained information, and operation 5 is performed: Plan tactics by using the obtained information. Operation 6 is performed: Custom edit the three-dimensional model based on an actual requirement in a corresponding editing interface. In this case, a presentation solution that information transmission compatible with autonomous editing of the player is implemented through a combination of the 3D model and the 3D UI is used for the player to quickly sense the presentation solution, understand mechanism of the presentation solution, try to fight and skilled use by using the information, and actively set the 3D model matching of the player outside game competition. This gives various game experience and playing enjoyment for the player, enables the player to simultaneously obtain a character model of the player and competition data information (including content of a word and a number) from the 3D model, and ensures sufficient information obtaining space for the player.

Figure 18:
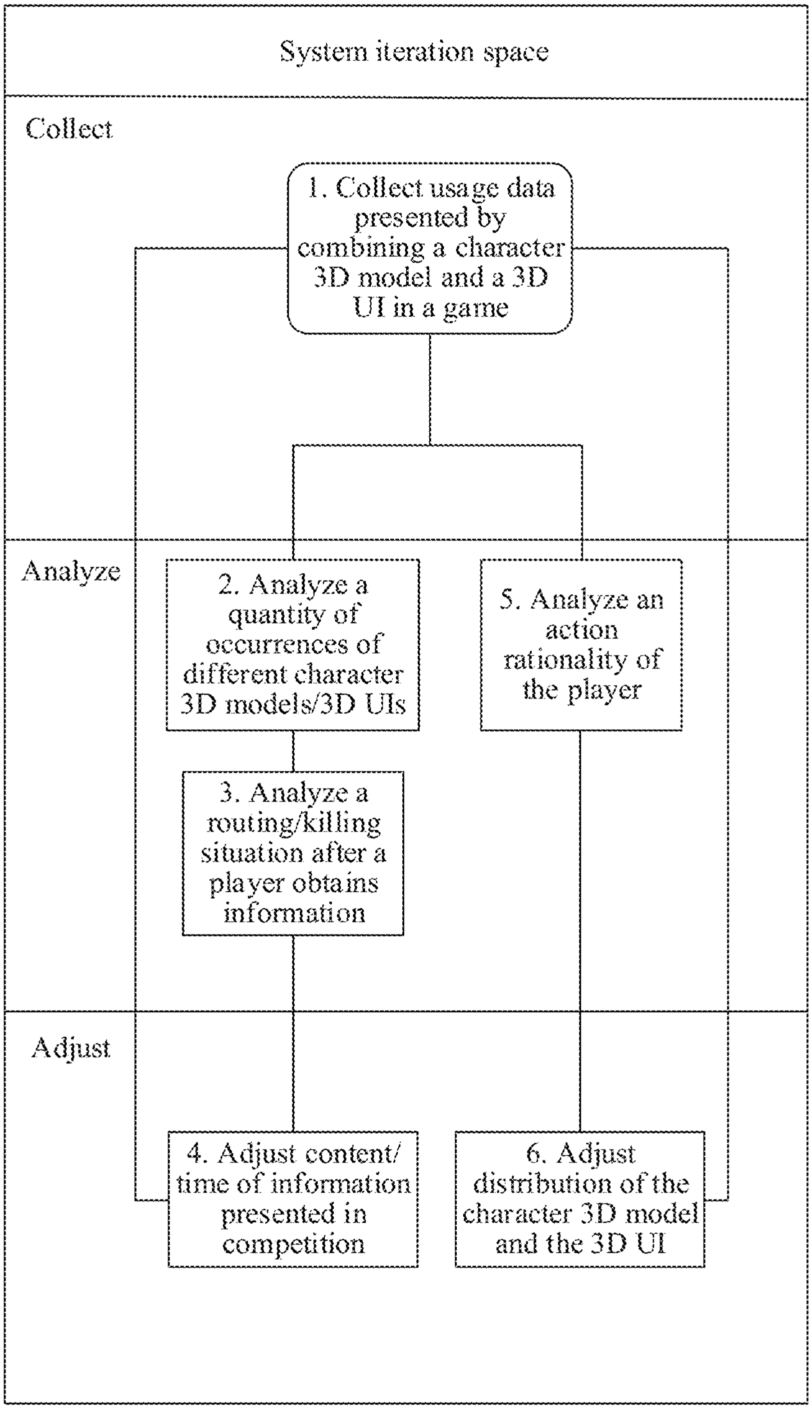
FIG. 18 is a flowchart of an implementation process of custom editing of a three-dimensional model according to an embodiment of this application.

In addition, referring to FIG. 18, FIG. 18 is a flowchart of an implementation process of custom editing of a three-dimensional model according to an embodiment of this application. For a designer from a development side, operation 1 is performed: Collect usage data displayed by combining a 3D model and a 3D UI of different characters in a game (characters controlled by a player). Then, operation 2 is performed: Analyze times of occurrences of each three-dimensional model, and then operation 3 is performed: Analyze a routing or a killing situation after the player obtains information. Operation 4 is performed: Adjust information content presented in game competition and presentation time of the three-dimensional model. In addition, operation 5 is performed: Analyze appropriately of an action of the player, and then, operation 6 is performed: Adjust distribution of the 3D model and the 3D UI. In this case, for the designer from the development side, the quantity of time of occurrences of the 3D model and 3D UI information of different characters in the game and performance usage after the player obtains the information are collected for analysis. This ensures that a system designer has sufficient adjustment space for content and duration for presenting the information in the competition, determines a future iterative direction of the system, and is easier to develop a character model setting that conforms to a world view setting. In addition, the player needs to learn related information such as an obtained character model and competition data to quickly perform tactical deployment of the player, so that the player can enrich playing tactical deployment by combining items, character skills and the like during the game, to bring more diverse experience of the competition. In addition, the development side can also bring more intense competition experience to the player based on the distribution of the 3D model and the 3D UI.

The following describes a technical implementation process of a method for processing data in a virtual scene provided in the embodiments of this application from an implementation aspect of a technical side.

From a performance perspective, an increase in the 3D model is accompanied by an increase in a quantity of times of operations (a quantity of drawcalls) that a CPU invokes an underlying graphics interface. This causes performance degradation. From a localization perspective, a conventional 3D model does not satisfy a requirement of multi-language. Therefore, the 3D model and the 3D UI may be combined to present a career card of the corresponding virtual object.

First, a career card that need to be presented is created, an editable static component (three medals and one border) and a UI component (a username, a season master value, a competition performance value, and the like) are mounted, an editable UI class is created, and the 3D UI is aligned to a border.

Figure 19:
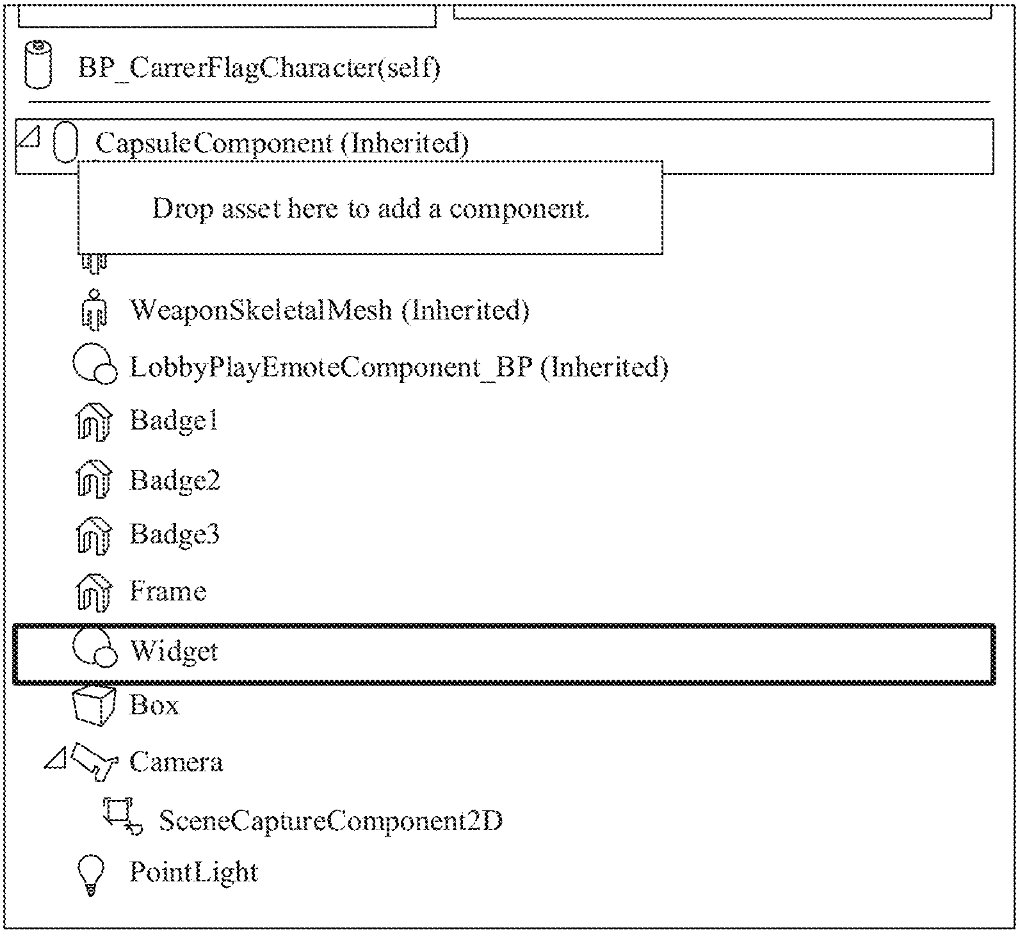
FIG. 19 is a schematic diagram of control configuration of an editing interface in a development tool according to an embodiment of this application.

For example, referring to FIG. 19, FIG. 19 is a schematic diagram of control configuration of an editing interface in a development tool according to an embodiment of this application. As shown in FIG. 19, StaticMesh of a medal is mounted on a Badge1, a Badge2, and a Badge3. A card border is mounted on a frame component. On a windget-component, a widgetblueprint is mounted to present a name, a score, and the like of a player, and a mesh component is configured to present a character model Avatar.

To reduce storage load of object information of a virtual object, during actual implementation, editing information may be saved by item identification (ID)→blueprint configuration→mapping method of a blueprint resource. Only the item identification (ID) autonomously edited by the player needs to be saved for a game background. When a career card is displayed, a client consolidates a needed resource path of the card by reading a table to find a related resource path based on item ID autonomously selected by the player and transmitted by a game server, and unifies and asynchronously loads a collated resource. When the resource is loaded, the resource is placed on the card.

To resolve a situation that a 3D UI needs to respond to a click, camera ray detection may be used to send a ray from a currently used camera to a clicked position, detect a collision body on the ray, and obtain a clicked item. This correctly triggers a click event. To achieve decoupling, an event system may also be used. Each click event is sent in an event manner, and is registered on demand. This facilitates later expansion and use of another system.

A Box collision box may also be added in a manufacturing process, a crash response parameter is adjusted, a size of the Box collision box is adjusted to be larger than a size of the career card (a size of an entire model), a vehicle and a person in the virtual scene are prohibited from passing through. This also solves a situation that the 3D UI is not collided, and is easy to have an error.

In this case, the 3D UI can be successfully combined with the 3D model. Therefore, this solves a performance consumption problem and provides sufficient editable space to the player.

Figure 20:
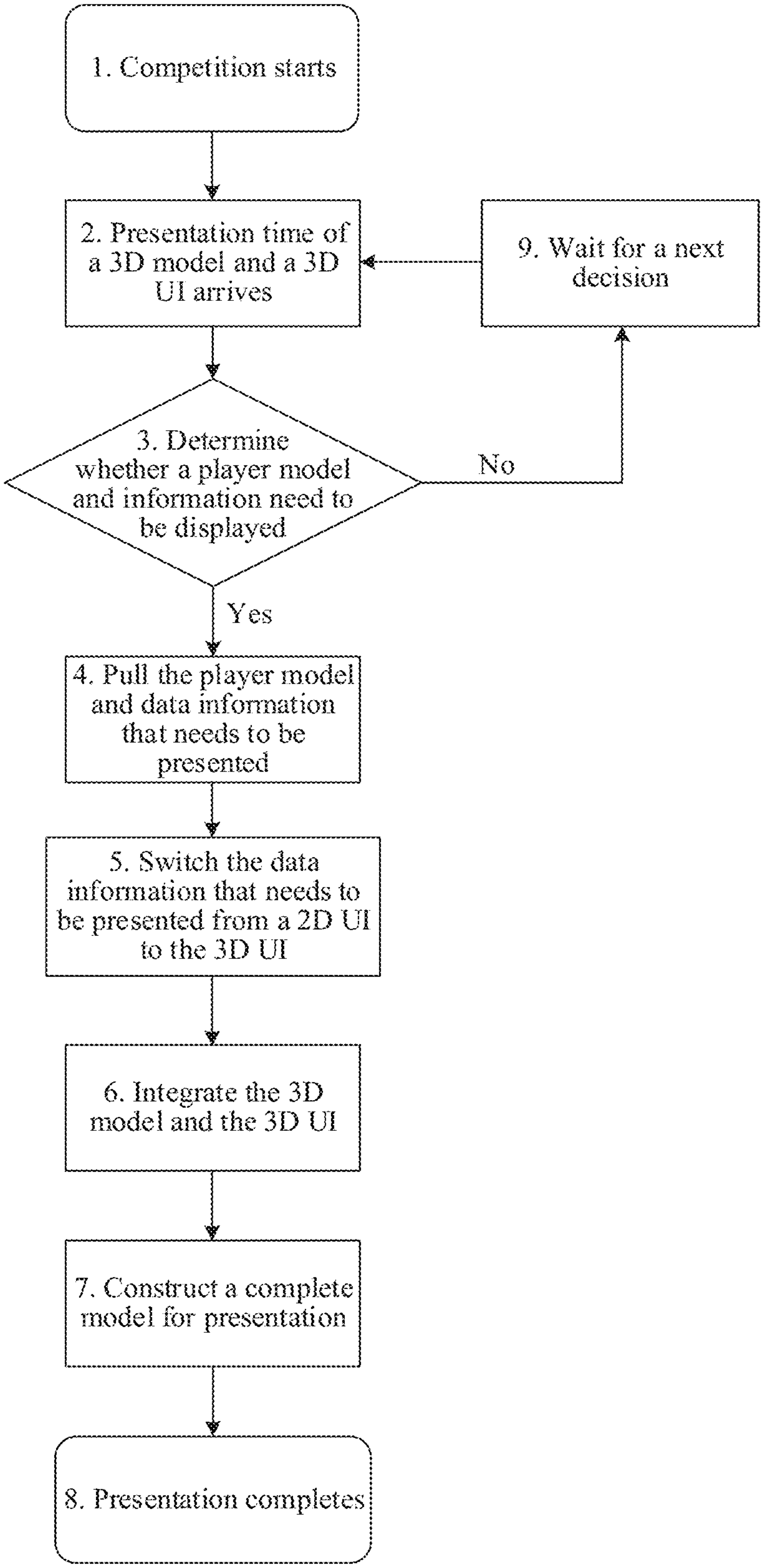
FIG. 20 is a flowchart of information transmission implemented based on a three-dimensional model according to an embodiment of this application.

During actual implementation, referring to FIG. 20, FIG. 20 is a flowchart of information transmission implemented based on a three-dimensional model according to an embodiment of this application. In the figure, operation 1 is performed: game competition starts. Operation 2 is performed: Presentation time of a 3D model and a 3D UI arrives. Operation 3 is performed: Determine whether a player model and information need to be displayed. If the player model and the information need to be displayed, operation 4 is performed: Pull the player model and data information that needs to be presented. If the player model and the information does not need to be displayed, operation 9 is performed: Wait for a next decision. After operation 4 is performed, operation 5 is performed: Switch the data information that needs to be presented from a 2D UI to the 3D UI. Operation 6 is performed: Integrate the 3D model and the 3D UI. Operation 7 is performed: Construct a complete model for presentation (that is, the foregoing target three-dimensional model). Operation 8 is performed: presentation for the three-dimensional model completes. In other words, after the competition starts, when the presentation time of presentation of the 3D model and the 3D UI is arrived, it is determined whether a model and information of the player needs to be presented. If the model and the information needs to be presented, the model and data information of the player are pulled, to-be-presented data information is changed from the 2D UI to the 3D UI, the 3D UI and the 3D model are combined into one entire model (that is, the three-dimensional model) for presentation, and entire model presentation is finally obtained. Based on this, presentation possibility of information transmission compatible with autonomous editing of the player is implemented through a combination of the 3D model and the 3D UI.

The embodiments of this application is applied to include the following beneficial effects.

(1) Compared with a conventional solution that a 3D model and 2D information are presented separately, this presentation solution that information transmission compatible with autonomous editing of the player is implemented through a combination of the 3D model and a 3D UI implements that the 2D information is fused in the 3D model. This has better visual performance, and has less pressure on art designing and the performance.

(2) On a premise that a basic setting of playing, a map, a virtual item, and the like is constant, the foregoing solution can provide novel experience to a player without affecting basic experience of a game, and increase playing enjoyment of the player.

(3) For a designer from a development side, the foregoing mechanism provides larger space for delivering commercial content, and better system extensibility.

The following continues to describe an exemplary structure in which implementation of a data processing apparatus 555 in a virtual scene provided in the embodiments of this application is a software module. In some embodiments, as shown in FIG. 2, the software module in the data processing apparatus 555 in the virtual scene stored in a memory 540 may include:

a response module 5551, configured to: in response to an editing instruction for a three-dimensional model and triggered by a target object, display an editing interface configured for editing the three-dimensional model of a virtual object, the three-dimensional model including a character model consistent with an appearance of the virtual object and/or a border model surrounding the character model, at least one information component being configured on the border model, and the information component carrying object information of the virtual object; and an editing module 5552, configured to construct a target three-dimensional model of the virtual object on the editing interface.

In some embodiments, the apparatus further includes:

a presentation module 5553, configured to: present a target three-dimensional model of the virtual object at a presentation position of the three-dimensional model in the virtual scene.

In some embodiments, the editing module is further configured to: receive the character editing instruction for the character model based on the editing interface, the character editing instruction being configured to instruct to edit character content of the character model, the character content including at least one of the following: a material, a posture, and an item; display at least one candidate character content corresponding to the character content in response to the character editing instruction; and in response to a selection instruction for the candidate character content, determine selected candidate character content as target character content of the character model, to obtain a target three-dimensional model having the target character content.

In some embodiments, the editing module is further configured to: display a content editing control of the character model in the editing interface, the content editing control including a material control configured for editing a material of the character model, a posture control configured for editing a posture of the character model, and an item control configured for editing an item of the character model; and receive the character editing instruction for the character model in response to a triggering operation for the content editing control.

In some embodiments, the editing interface includes a preview area of the character model, and the editing module is further configured to: display a preview image of the character model in the preview area of the character model; and receive the character editing instruction in response to a triggering operation for a target part in the preview image, the character editing instruction being configured to instruct to edit character content corresponding to the target part, and different sections in the preview image corresponding to different character content.

In some embodiments, the editing interface includes a preview area of the character model, and the editing module is further configured to: in response to a selection instruction for the candidate character content, display, in a preview area of the character model, a preview image of the character model having the target character content.

In some embodiments, the editing module is further configured to display a plurality of candidate postures when the character content comprises the posture.

Correspondingly, in some embodiments, the editing module is further configured to: in response to a selection instruction for the candidate posture, determine a selected candidate posture as a target posture of the character model.

Correspondingly, in some embodiments, the presentation module is further configured to: present, at a presentation position of the three-dimensional model in the virtual scene, a process in which the target three-dimensional model of the virtual object performs the target posture in sequence.

In some embodiments, the editing module is further configured to: receive a border editing instruction for the border model based on the editing interface, the border editing instruction being configured to instruct to edit the border model; display at least one candidate border model in response to the border editing instruction; and in response to a selection instruction for the candidate border model, determine a selected candidate border model as a target border model, to obtain the target three-dimensional model having the target border model.

In some embodiments, the editing module is further configured to: display a border editing control corresponding to the border model in the editing interface; and receive the border editing instruction for the border model in response to a triggering operation for the border editing control.

In some embodiments, the editing interface includes a preview area of the border model, and the editing module is further configured to: display a selected candidate border model in the preview area of the border model in response to a selection instruction for the candidate border model.

In some embodiments, the editing module is further configured to: display at least one addition bit of the information component on the candidate border model in the preview area of the border model; display at least one type of object information of the virtual object in response to a triggering operation for the addition bit; and display an information component corresponding to the object information on the addition bit in response to a selection operation for the object information.

In some embodiments, the editing module is further configured to: display an editing control for editing the information component in the editing interface; display at least one type of object information of the virtual object in response to a triggering operation for the editing control; and in response to a selection operation for the object information, determine the information component corresponding to selected object information as information component of the border model in the target three-dimensional model.

In some embodiments, the presentation module is further configured to: obtain presentation time of the target three-dimensional model; and when the presentation time is arrived, determine that the presentation condition of the target three-dimensional model is satisfied; or display a presentation control of the target three-dimensional model, and when the presentation control is triggered, determine that the presentation condition of the target three-dimensional model is satisfied.

In some embodiments, the presentation module is further configured to: displaying an interface of the virtual scene, and when an editing condition of the three-dimensional model is satisfied, display editing prompt information in the interface of the virtual scene, the editing prompt information being configured to prompt that the target object has a permission to edit the three-dimensional model; and receive the editing instruction triggered based on the editing prompt information.

In some embodiments, the presentation module is further configured to: when at least one of the following is satisfied, determine that the editing condition of the three-dimensional model is satisfied; obtain interaction performance of the virtual object in the virtual scene, the interaction performance reaching a performance threshold; or obtain a virtual resource of the virtual object in the virtual scene, a virtual resource size reaching a resource size threshold.

In some embodiments, the presentation module is further configured to: obtain a position of the virtual object in the virtual scene when there are at least two presentation positions; select, based on the position of the virtual object in the virtual scene, a nearest presentation position of the virtual object from the at least two presentation positions as a target presentation position; and present the target three-dimensional model of the virtual object at the target presentation position.

In some embodiments, the presentation module is further configured to: when there are at least two presentation positions, and the at least two presentation positions correspond to two teams, determine a presentation position corresponding to the team to which the virtual object belongs at the at least two presentation positions; when there are at least two presentation positions corresponding to the team to which the virtual object belongs, generate duplicates of the target three-dimensional model; and present the corresponding duplicates of the target three-dimensional model respectively at the presentation positions corresponding to the team to which the virtual object belongs.

In some embodiments, the presentation module is further configured to: obtain virtual weather corresponding to the presentation position of the three-dimensional model in the virtual scene; and when the virtual weather is target weather, display the target three-dimensional model in a blurring state at the presentation position of the three-dimensional model in the virtual scene.

In some embodiments, the presentation module is further configured to: receive a target operation performed by a target virtual object for the target three-dimensional model; and display an operation result of the target operation in response to the target operation.

The embodiments of this application provide a computer program product or a computer program, the computer program product or the computer program including computer-executable instructions, and the computer-executable instructions being stored in a non-transitory computer-readable storage medium. A processor of an electronic device reads the computer-executable instructions from the computer-readable storage medium, and the processor executes the computer-executable instructions, so that the electronic device performs the method for processing data in a virtual scene in the embodiments of this application.

The embodiments of this application provide a non-transitory computer-readable storage medium of computer-executable instructions, having the computer-executable instructions stored therein. When the computer-executable instructions are executed by a processor, the processor may perform a method for processing data in a virtual scene provided in the embodiments of this application, for example, a sending method of bullets shown in FIG. 3.

In some embodiments, the computer readable storage medium may be a memory such as a read-only memory (ROM), a random access memory (RAM), an erasable programmable read-only memory (EPROM), an electrically erasable programmable read-only memory (EEPROM), a flash, a magnetic surface memory, an optical disc, or a CD-ROM, or may be various devices including one or any combination of the foregoing memories.

In some embodiments, the executable instructions may be written in any form of programming language (including a compiled or interpreted language, or a declarative or procedural language) in a form of a program, software, a software module, a script, or code, and may be deployed in any form, including being deployed as an independent program or being deployed as a module, a component, a subroutine, or another unit applicable for use in a computing environment.

For example, the executable instructions may, but do not necessarily correspond to a file in a file system, and may be stored as a part of a file that saves another program or data, for example, stored in one or more scripts in a hypertext markup language (HTML) file, stored in a single file dedicated to a program in discussion, or stored in a plurality of collaborative files (for example, files that store one or more modules, subprograms, or code parts).

For example, the executable instructions may be deployed to be executed on one electronic device, or executed on a plurality of electronic devices located at one location, or executed on a plurality of electronic devices that are distributed in a plurality of locations and interconnected by a communication network.

In conclusion, by the embodiments of this application, there are the following beneficial effects: on-demand editing for a three-dimensional model may be implemented, flexibility of an editing operation is improved, integrity of the three-dimensional model during presentation may be ensured, and a presentation effect of the three-dimensional model is improved.

In sum, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions described above are merely examples of the embodiments of this application, and this is not intended to limit the protection scope of this application. Any modification, equivalent replacement, and improvement made within the spirit and scope of this application shall fall within the protection scope of this application.

What is claimed is:

1. A method for processing data in a virtual scene performed by an electronic device, the method comprising:

receiving an instruction for editing a three-dimensional model of a virtual object controlled by a target user in the virtual scene;

in response to the instruction, displaying an editing interface configured for editing the three-dimensional model of the virtual object, the three-dimensional model comprising a character model having an appearance of the virtual object and at least one information component carrying object information of the virtual object;

constructing a target three-dimensional model of the virtual object on the editing interface in accordance with subsequent instruction from the target user;

obtaining a position of the virtual object in the virtual scene when there are at least two presentation positions;

selecting, based on the position of the virtual object in the virtual scene, a nearest presentation position of the virtual object from the at least two presentation positions as a target presentation position; and presenting the target three-dimensional model of the virtual object at the target presentation position.

2. The method according to claim 1, wherein the method further comprises:

receiving a character editing instruction for the character model by the target user through the editing interface;

displaying at least one candidate character content corresponding to the character model in response to the character editing instruction; and in response to a selection instruction by the target user, determining, among the at least one candidate character content, user-selected candidate character content as target character content of the character model, to obtain a target three-dimensional model having the target character content.

3. The method according to claim 2, wherein the receiving a character editing instruction for the character model based on the editing interface further comprises:

displaying a content editing control of the character model in the editing interface, the content editing control comprising a material control configured for editing a material of the character model, a posture control configured for editing a posture of the character model, and an item control configured for editing an item of the character model; and receiving the character editing instruction for the character model in response to a triggering operation for the content editing control.

4. The method according to claim 2, wherein the editing interface comprises a preview area of the character model, and the receiving a character editing instruction for the character model based on the editing interface further comprises:

displaying a preview image of the character model in the preview area of the character model; and receiving the character editing instruction in response to a triggering operation for a target part in the preview image, the character editing instruction being configured to instruct to edit character content corresponding to the target part, and different parts in the preview image corresponding to different character content.

5. The method according to claim 2, wherein the method further comprises:

in response to the selection instruction for the candidate character content, displaying, in a preview area of the character model, a preview image of the character model having the target character content.

6. The method according to claim 2, wherein the displaying at least one candidate character content corresponding to the character content further comprises:

displaying a plurality of candidate postures when the character content comprises the posture;

in response to a selection instruction for the candidate posture, determining a selected candidate posture as a target posture of the character model; and presenting, at a presentation position of the three-dimensional model in the virtual scene, a process in which the target three-dimensional model of the virtual object performs the target posture.

7. The method according to claim 1, wherein the method further comprises:

receiving a border editing instruction for a border model of the three-dimensional model of the virtual object by the target user through the editing interface;

displaying at least one candidate border model in response to the border editing instruction; and in response to a selection instruction by the target user, determining, among the at least one candidate border model, a user-selected candidate border model as a target border model, to obtain the target three-dimensional model having the target border model.

8. The method according to claim 7, wherein the receiving a border editing instruction for a border model of the three-dimensional model of the virtual object by the target user through the editing interface further comprises:

displaying a border editing control corresponding to the border model in the editing interface; and receiving the border editing instruction for the border model in response to a triggering operation for the border editing control.

9. The method according to claim 8, wherein the method further comprises:

displaying the selected candidate border model in a preview area of the border model in response to a selection instruction for the candidate border model.

10. The method according to claim 1, wherein the method further comprises:

displaying an editing control for editing the at least one information component in the editing interface;

displaying at least one type of object information of the virtual object in response to a triggering operation for the editing control by the target user; and in response to a selection operation by the target user, determining, among the at least one type of object information of the virtual object, an information component corresponding to the user-selected object information as an information component of the border model in the target three-dimensional model.

11. The method according to claim 1, wherein the method further comprises:

when a presentation condition of the target three-dimensional model is satisfied, presenting the target three-dimensional model of the virtual object at a presentation position of the three-dimensional model in the virtual scene.

12. The method according to claim 1, wherein the method further comprises:

when there are at least two presentation positions, and the at least two presentation positions correspond to two teams, determining a presentation position corresponding to a team to which the virtual object belongs at the at least two presentation positions;

generating duplicates corresponding to the target three-dimensional model when there are at least two presentation positions corresponding to the team to which the virtual object belongs; and presenting the duplicates corresponding to the target three-dimensional model respectively at the presentation positions corresponding to the team to which the virtual object belongs.

13. The method according to claim 1, wherein the method further comprises:

obtaining virtual weather corresponding to a presentation position of the three-dimensional model in the virtual scene; and displaying the target three-dimensional model in a blurring state at the presentation position of the three-dimensional model in the virtual scene according to the obtained virtual weather.

14. The method according to claim 1, wherein the method further comprises:

while presenting the target three-dimensional model, receiving a target operation performed by a target virtual object for the target three-dimensional model; and displaying an operation result of the target operation in response to the target operation.

15. An electronic device, comprising:

a memory, configured to store executable instructions; and a processor, configured to, when executing the executable instructions stored in the memory, cause the electronic device to perform a method for processing data in a virtual scene including:

receiving an instruction for editing a three-dimensional model of a virtual object controlled by a target user in the virtual scene;

in response to the instruction, displaying an editing interface configured for editing the three-dimensional model of the virtual object, the three-dimensional model comprising a character model having an appearance of the virtual object and at least one information component carrying object information of the virtual object;

constructing a target three-dimensional model of the virtual object on the editing interface in accordance with subsequent instruction from the target user;

obtaining a position of the virtual object in the virtual scene when there are at least two presentation positions;

selecting, based on the position of the virtual object in the virtual scene, a nearest presentation position of the virtual object from the at least two presentation positions as a target presentation position; and presenting the target three-dimensional model of the virtual object at the target presentation position.

16. The electronic device according to claim 15, wherein the method further comprises:

when a presentation condition of the target three-dimensional model is satisfied, presenting the target three-dimensional model of the virtual object at a presentation position of the three-dimensional model in the virtual scene.

17. The electronic device according to claim 15, wherein the method further comprises:

while presenting the target three-dimensional model, receiving a target operation performed by a target virtual object for the target three-dimensional model; and displaying an operation result of the target operation in response to the target operation.

18. A non-transitory computer-readable storage medium, having computer-executable instructions stored therein, the computer-executable instructions, when executed by a processor of an electronic device, causing the electronic device to perform a method for processing data in a virtual scene including:

receiving an instruction for editing a three-dimensional model of a virtual object controlled by a target user in the virtual scene;

in response to the instruction, displaying an editing interface configured for editing the three-dimensional model of the virtual object, the three-dimensional model comprising a character model having an appearance of the virtual object and at least one information component carrying object information of the virtual object;

constructing a target three-dimensional model of the virtual object on the editing interface in accordance with subsequent instruction from the target user;

obtaining a position of the virtual object in the virtual scene when there are at least two presentation positions;

selecting, based on the position of the virtual object in the virtual scene, a nearest presentation position of the virtual object from the at least two presentation positions as a target presentation position; and presenting the target three-dimensional model of the virtual object at the target presentation position.

19. The non-transitory computer-readable storage medium according to claim 18, wherein the method further comprises:

when a presentation condition of the target three-dimensional model is satisfied, presenting the target three-dimensional model of the virtual object at a presentation position of the three-dimensional model in the virtual scene.

20. The non-transitory computer-readable storage medium according to claim 18, wherein the method further comprises:

while presenting the target three-dimensional model, receiving a target operation performed by a target virtual object for the target three-dimensional model; and displaying an operation result of the target operation in response to the target operation.

* * * * *